US007670127B2

(12) United States Patent
Heidari

(10) Patent No.: US 7,670,127 B2
(45) Date of Patent: Mar. 2, 2010

(54) APPARATUS FOR PATTERN REPLICATION WITH INTERMEDIATE STAMP

(75) Inventor: Bakak Heidari, Furulund (SE)

(73) Assignee: Obducat AB, Malmo (SE)

( * ) Notice: Subject to any disclaimer, the term of this patent is extended or adjusted under 35 U.S.C. 154(b) by 665 days.

(21) Appl. No.: 11/305,157

(22) Filed: Dec. 19, 2005

(65) Prior Publication Data

US 2007/0134362 A1 Jun. 14, 2007

(30) Foreign Application Priority Data

Dec. 9, 2005 (EP) ................................ 05111920

(51) Int. Cl.
*B29C 59/00* (2006.01)
*B29B 13/08* (2006.01)

(52) U.S. Cl. ...................... 425/385; 264/293; 425/388; 425/174.4

(58) Field of Classification Search ................ 425/385, 425/388, 174.4; 264/293
See application file for complete search history.

(56) References Cited

U.S. PATENT DOCUMENTS 4,211,617 A 7/1980 Hunyar
6,334,960 B1 1/2002 Wilson et al.
6,705,853 B1 * 3/2004 Nehring ..................... 425/504
7,204,686 B2 * 4/2007 Chung et al. ............... 425/385
2002/0089088 A1 7/2002 Ils et al.
2003/0159608 A1 * 8/2003 Heidari ...................... 101/494
2003/0211297 A1 * 11/2003 Rossing et al. ........... 428/195.1
2004/0170771 A1 9/2004 Bailey et al.
2004/0219803 A1 11/2004 Staecker et al.
2005/0146083 A1 7/2005 Olsson
2005/0191419 A1 9/2005 Helt
2007/0102844 A1 * 5/2007 Simon et al. ............... 264/259

FOREIGN PATENT DOCUMENTS

WO WO 02/98494 * 2/2002
WO WO 2005/045524 A2 5/2005
WO WO 2005/054948 * 6/2005 ................ 425/388

* cited by examiner

*Primary Examiner*—Maria Veronica D Ewald
(74) *Attorney, Agent, or Firm*—Renner, Otto, Boisselle & Sklar, LLP

(57) ABSTRACT

The invention relates to an imprint apparatus for carrying out a two-step process for transferring a pattern from a template to a target surface of a substrate. The apparatus works by creating an intermediate disc, e.g. from a flexible polymer stamp, by imprint from the template in a first imprint unit. A feeder device is then operated to feed the intermediate stamp to a second imprint unit, where it is used to make an imprint in a target surface of a substrate.

31 Claims, 13 Drawing Sheets

APPARATUS FOR PATTERN REPLICATION WITH INTERMEDIATE STAMP

FIELD OF INVENTION

The present invention relates to an apparatus for use in a pattern transfer process for imprint lithography, which involves a process for transferring a pattern from a template having a structured surface to a target surface of a substrate. More particularly, the invention relates to an apparatus comprising double imprint units, which are operated in synchronization with each other for performing a two step process. In the first imprint unit, a replica of the template pattern is formed in or on an intermediate disc, preferably a flexible polymer foil, by imprint to obtain an intermediate stamp. The intermediate stamp is then moved from the first imprint unit to the second imprint unit, where the intermediate stamp is used in a secondary step to imprint the pattern in a moldable layer of the target surface of the substrate.

BACKGROUND

One of the most powerful techniques for reproducing nanostructures—i.e. structures in the order of 100 nm or smaller—is nanoimprint lithography (NIL). In nanoimprint lithography an inverted copy of the surface pattern of a template—often called a stamp—is transferred into an object, comprising a substrate and, applied thereto, a film of a moldable layer often called resist, e.g. a polymer material. After heating the object to a suitable temperature above the glass transition temperature of the polymer film the stamp is pressed towards the film followed by cooling and release—often called demolding—of the stamp, after the desired pattern depth has been transferred into the film. Alternatively, the substrate is covered by a photo-resist material, i.e. a polymer which is sensitive to radiation such that it is cross-linked upon exposure to ultraviolet (UV) radiation, or a pre-polymer which is cured into a polymer upon exposure to radiation. This requires that either the substrate or the stamp is transparent to the applied radiation. In a subsequently performed process after the achieved imprint, the object—comprising the substrate and the patterned polymer film—can be post-processed e.g. by etching of the substrate within the imprinted regions to transfer the pattern to a target surface of the substrate.

The imprint process described above exhibits some difficulties, which have to be considered in order to achieve a perfect pattern transfer from the template into the moldable layer covering the substrate.

If the template and the substrate are not made of the same material, which they generally are not, they will typically have different thermal expansion coefficients. This means that during heating and cooling of the template and the substrate, the extent of expansion and contraction will be different. Even though the dimensional change is small, it may be devastating in an imprint process, since the features of the pattern to be transferred are in the order of micrometers or even nanometers. The result may therefore be reduced replication fidelity.

Very often an inflexible stamp or substrate material is used, and this can lead to the inclusion of air between the stamp and the moldable layer when the stamp is pressed towards the substrate, also downgrading the replication fidelity. Furthermore, inclusion of particles between the stamp and the moldable layer during an imprint process can lead to pronounced damages of either the stamp or the substrate especially when neither the stamp nor the substrate are composed of a flexible material. Physical damage to the stamp or the substrate or both can also be caused upon demolding of an inflexible stamp from an inflexible substrate, and it is difficult to demold a substrate and a template including patterns with high aspect ratio after an imprint process. A once damaged stamp is usually not recyclable.

SUMMARY OF THE INVENTION

It is an object of the invention to provide a solution for an improved imprint system, having high replication fidelity, and which is easy and suitable to employ industrially.

An embodiment of the invention, devised to fulfill the stated object, relates to an apparatus for transferring a pattern of a structured surface of a template to a target surface of a substrate, comprising a first imprint unit including a first pair of cooperating main parts arranged opposite to one another with an intermediate first spacing, and a first press device for adjusting the first spacing, operable to transfer the pattern of the template to a receiving surface of a disc in a first imprint step, a second imprint unit including a second pair of cooperating main parts arranged opposite to one another with an intermediate second spacing, and a second press device operable to adjust the second spacing, and a feeder device operable to move a disc from the first spacing to the second spacing.

In a preferred embodiment, the feeder device is controlled to grab an imprinted disc in the first spacing, move it to the second spacing, and release and position the disc in contact with a substrate, such that the imprinted surface of the intermediate stamp faces a moldable layer on the target surface of the substrate. Thereafter, the second imprint unit is operable to imprint the transferred pattern of the disc to the target surface in a second imprint step.

The invention thereby provides an automated imprint apparatus, where the process of transferring a pattern from a master template to a substrate is performed over two imprint steps carried out in two operatively connected imprint units. Preferably, a polymer foil is used for the disc to create the intermediate stamp. This way, the template will only be used for imprint in the comparatively soft material of the polymer foil, which minimizes wear and the risk of damage, compared to imprint directly on a comparatively hard semiconductor substrate.

BRIEF DESCRIPTION OF THE DRAWINGS

Embodiments of the invention will be described in more detail below, with reference to the accompanying drawings, on which.

DETAILED DESCRIPTION OF PREFERRED EMBODIMENTS

Figure 1:
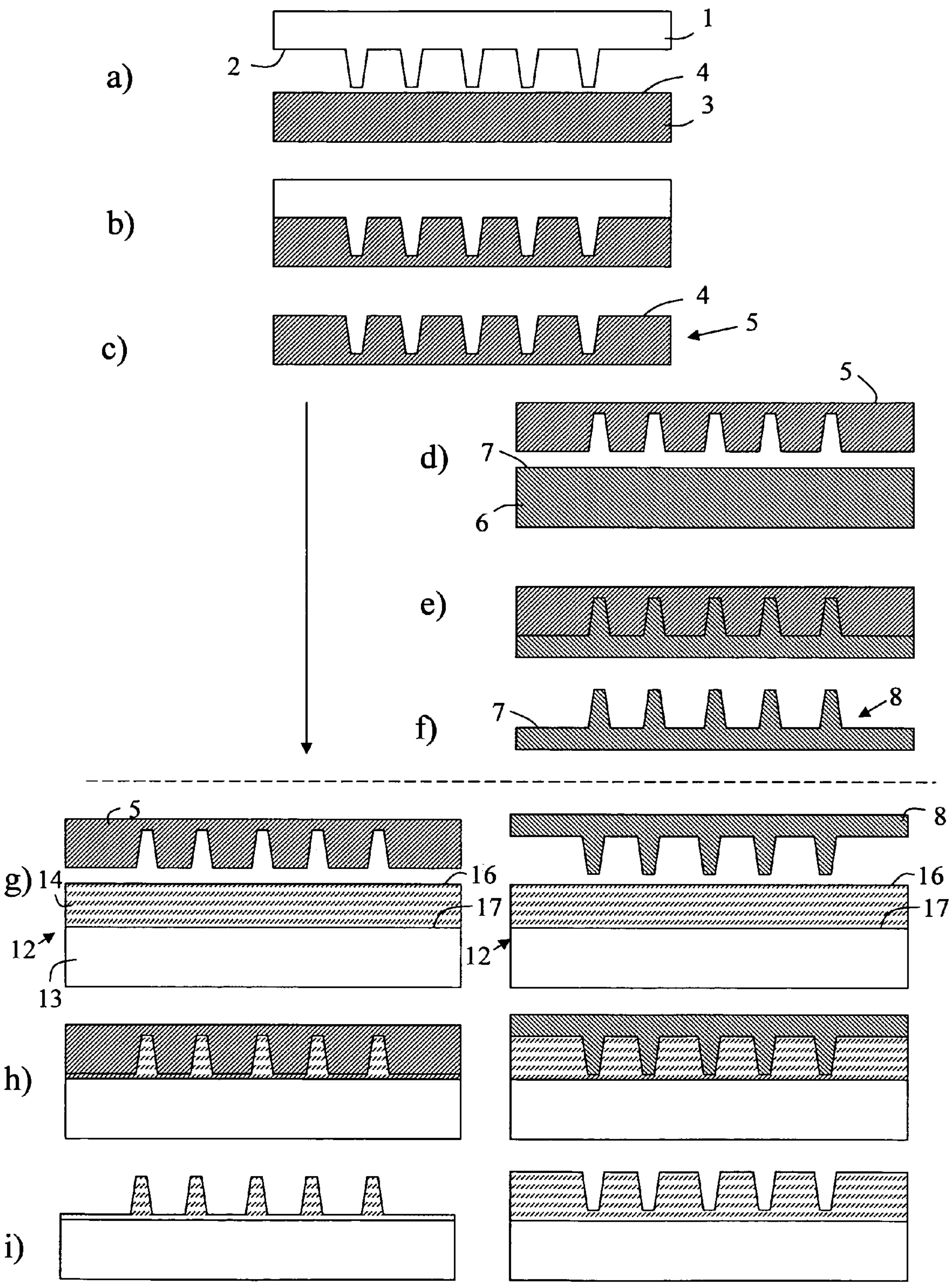
FIG. 1 schematically illustrates the two-step process to manufacture replicas from a template into an object surface according to an embodiment of the invention.

The present invention relates to what is herein referred to as a "two-step imprint process". This term is to be understood as a process in which in a first step one or more replicas of a template having a nanometer and/or micrometer size patterned surface is formed into one or more flexible polymer foils by an imprint process. The imprinted polymer foil may be used as a polymer stamp in a second step. Alternatively, the imprinted polymer foil is used as a stamp to make another imprint on another polymer foil, which is subsequently used in the second step. This way, the first step of the process may generate both negative polymer replicas, where the pattern is inverted to that of the original template, and flexible positive polymer replicas, where the pattern is similar to that of the original template. In the second step a so-produced replica can be used as a flexible polymer stamp to reproduce the pattern into an object surface through a subsequent performed imprint process employing thermal imprint, UV-imprint, or both.

The term "nano-imprinting process" or "imprint process" as used herein refers to a process for the creation of an inverted copy of a nano- and/or micro-structured surface pattern of a template or stamp, which is generated by pressing the stamp into a moldable layer, such as a polymer or pre-polymer, in order to deform the layer. The layer may be a separately coated film on top of a base or substrate, where the base and the layer may be of different materials. Alternatively, the layer may simply be a portion of a single material object, where the layer is defined as a portion stretching from a surface of the object down to a certain depth into the bulk of the object. The moldable layer may either be heated-up above its glass transition temperature $T_g$ followed by cooling-down to below said glass transition temperature during the imprinting (e.g., hot embossing) process, and/or the polymer may be cured or cross-linked with the help of UV-light exposure during or after the imprinting process. The patterned surface of the template, and of the imprinted layers, may have structures on a micrometer or nanometer scale both in terms of depth and width.

The term "flexible polymer foil" refers to a flexible and ductile in the most cases transparent foil comprising a thermoplastic polymer, a thermosetting polymer, and/or a polymer, cross-linkable after exposure to radiation. Preferred embodiments of the polymer foil include polycarbonate, polymethyl methacrylate (PMMA) and cyclo-olefin copolymer (COC).

The term "replication fidelity" refers to the creation of an inverted copy of the stamp structure in which the inverted topography of the stamp surface is completely reproduced.

In accordance with the invention, a two-step imprint process is provided, where in a first step of this two-step process, replicas of a template having a patterned surface are formed by imprint in an intermediate disc. In most of the embodiments given below, the disc is a flexible polymer foil. An alternative solution, which is not discussed any further, is to provide the intermediate disc by means of another material, such as a thin sheet of metal or a semiconductor material, of which one side is coated with a moldable layer, such as a polymer or a pre-polymer. In such an embodiment, it is the coated side of the sheet that is imprinted in the first step with the template, and which is used as the stamp surface in the second step. The use of a polymer foil has several advantages, though, such as low cost and flexibility, and that the polymer material is generally softer than the material of both the template and the substrate. Below, reference to a flexible polymer foil will therefore mainly be made when the intermediate disc is discussed.

In a second step the replicas are used as stamps, preferably flexible polymer stamps, to reproduce the pattern into an object surface through a subsequent imprint process. In at least the second step, radiation-assisted imprint is preferably performed at a controlled constant temperature, such that thermal expansion effects are minimized.

This way a durable and comparatively inflexible template may advantageously be used, made of a material such as a metal, quartz, silicon or other substantially inflexible material, for imprinting its pattern in a flexible polymer foil to create the polymer stamp, and the polymer stamp may then advantageously be used for imprint in a moldable layer on the target surface of the substrate. By means of the invention, the relatively hard and inflexible template is used for imprint in the relatively softer and more flexible polymer foil to create an intermediate polymer stamp, where after the relatively flexible and soft polymer stamp is used for imprint in the moldable layer on the relatively harder and less flexible substrate, which may be of e.g. silicon. An imprint step between two substantially hard and inflexible materials, such as metal and silicon or quartz and silicon is thereby advantageously avoided, with the result that the template is less worn and fewer substrates are damaged.

Furthermore, by using a polymer foil as a basis for the intermediate disc or stamp, which is transparent to a wavelength range usable for cross-linking or in other ways solidifying a radiation-sensitive moldable layer, radiation-assisted imprint may selectively be used both for creating the polymer stamp and when using the polymer stamp for imprint on the substrate, while both the template and the substrate may be provided in materials which are not transparent to radiation of a usable wavelength range.

The template is a comparatively expensive element to produce and it is, as mentioned, generally not possible to repair or recycle a once damaged template. The polymer stamp, however, is easily manufactured from a comparatively inexpensive material in accordance with the method according to the invention, and is preferably disposed after being used a couple of times, or even only once. The polymer stamp may be demolded, or released, from the substrate and then thrown away, or it may be dissolved when still attached to the target surface of the substrate in a bath with a suitable liquid solution selected to dissolve the polymer stamp but not the substrate or the solidified moldable layer on the target surface of the substrate.

Since the created polymer stamp is used as a secondary template for imprint on the target surface of the substrate, and the substrate generally is not a polymer material, the thermal expansion coefficients of the polymer stamp and the substrate will typically differ. In order to overcome the aforementioned drawbacks resulting from such a scenario, at least the secondary imprint step where the polymer stamp is pressed into the moldable layer on the substrate, is performed according to a combined radiation- and heat-assisted imprint process. According to this process, a radiation-sensitive material is used as the moldable layer on the substrate, and the steps of pressing the polymer stamp and the substrate together, flooding the moldable layer with radiation, and postbaking the layer, and preferably also the steps of releasing the pressure and demolding the polymer stamp from the substrate, are performed at an elevated constant temperature maintained by means of a temperature control device. The temperature control device typically includes a heater device and a control circuit for balancing supply of heat to obtain and maintain a determined temperature, and possibly also a cooling device.

The first, or primary, step of the two step process will now be described with reference to FIGS. 1*a* to 1*f* of the drawings. The process of the primary step according to two different embodiments are schematically illustrated in FIG. 1. The process of FIGS. 1*a* to 1*f* illustrate creation of an intermediate polymer stamp using thermal imprint. However, there are other possible techniques for creating the polymer stamp as will be outlined below.

FIG. 1*a* displays a template 1, composed of e.g. silicon, nickel or other metal such as aluminum, quartz, or even a polymer material. Template 1 has a patterned surface 2, comprising ribs, grooves, protrusions or recesses, having heights and widths in the order of micrometers or nanometers. The template 1 is placed with surface 2 facing and contacting a surface 4 of a flexible polymer foil 3 made of e.g. a thermoplastic polymer, a thermosetting polymer, and/or a polymer, which is cross-linkable e.g. with the help of exposure to radiation. More specific examples of suitable polymer foil materials include polycarbonate, COC and PMMA. In a preferred embodiment, template surface 2 of and surface 4 of the polymer foil 3 exhibit anti-adhesion properties against to each other, due to their material compositions or characteristics of an anti-adhesion layer provided on template surface 2 and/or polymer foil surface 4.

With the help of a suitable imprint process as illustrated in FIG. 1*b*) an inversion of the pattern of template surface 2 is formed into a surface layer at surface 4 of the flexible polymer foil 3. After the template surface 2 has been placed in contact with surface 4 of polymer foil 3, the polymer foil is heated to a temperature above the glass temperature $T_g$ of the used polymer in the surface layer of the foil. The polymer foil may be massive, i.e. having more or less the same composition throughout the entire polymer foil, or it may have a base composition of the actual polymer foil with an applied surface layer at surface 4 of another composition adapted for imprint. When the surface layer has reached its glass transition temperature, pressure is applied to press template 1 and polymer foil 3 together such that the pattern of surface 2 is imprinted in the surface layer at surface 4 of polymer foil 3. Pressing may be achieved by means of a soft press technique using a fluid or gas pressure supplied by means of a membrane, as will be explained in more detail with reference to the secondary step of the process according to the invention. Alternatively, a more conventional hard press technique may be used. Since the polymer stamp created in the primary step is not the final product, parallelism is not a crucial element of the primary step in the same manner as for the secondary step.

As mentioned, the illustrated embodiment makes use of thermal imprint, and polymer foil 3 is therefore heated before the pressure is applied, in order to soften the surface layer. Specific examples according to the above thermal primary step are given below. Alternative methods may alternatively or additionally include applied exposure of selected portions of the polymer foil to radiation. If the material of the polymer foil is also to be cross-linked by exposure to radiation, either the material of the template 1 or that of the polymer foil 3 must be transparent to the applied radiation. Alternative embodiments include a thermally or UV-curable pre-polymer composition in the surface layer at surface 4 of polymer foil 3. In such an embodiment heating above the glass transition temperature is not necessary.

In one example of a UV-NIL process, a UV-curable pre-polymer is dispensed at suitable positions across surface 2 of template 1, and it is afterwards covered with a polycarbonate or PMMA sheet, corresponding to foil 3 in FIG. 1. The sheet works later as UV-transparent substrate in the second imprint process. Thanks to the fact that a carrier base is provided by the sheet, which is highly transparent to UV radiation, the thickness of the actual surface layer provided by the pre-polymer layer can be kept at a minimum level of only a few nanometers. This is particularly useful when pre-polymer materials are used which do not lose their UV-absorbing property after curing, such as PAK01 from Toyo Gosei, Japan. Another usable UV-curable pre-polymers is NIF-1 from Asahi Glass Corporation Japan, but any other UV-curable pre-polymer might function just as good or better. A good UV-polymer loses its UV-absorbing properties after curing in order to increase UV-transmission in the second imprint stage. However, the combination of pre-polymer and polymer sheet should be selected with some care to avoid chemical dissolution of the sheet by the pre-polymer but having good enough interaction between those to guarantee good adhesion between them. After the substrate foil is placed on top of the dispensed pre-polymer droplets with inclusion of air bubbles, a UV-transparent polymer membrane is placed on top of the polymer sheet. This membrane is then pressurized on the opposite side with a comparably low pressure ranging from 1 to 20 bar, provided by a gas or liquid pressure, and UV-radiation of a suitable dose exposes and cures the pre-polymer through the polymer sheet and the polymer membrane thereby curing the pre-polymer and bonding it to the polymer foil. The pressure is released followed by removal of imprint membrane and demolding of the thus-created polymer stamp from the template.

In a thermal NIL-process the template, or master, is covered with a suitable polymer sheet such as Topas from Ticona, USA, or Zeonor from Zeon Corp., Japan. After placement of the imprint membrane on top of the polymer sheet the sandwich is sucked by vacuum and heated. When the imprint temperature is reached the membrane is pressurized between 20-80 bars. After pattern transfer to the polymer film the sandwich is cooled below glass transition temperature followed by removal of imprint membrane and demolding of the IPS stamp from the master. A good thermoplastic sheet needs to have a narrow process window regarding imprint temperature and release temperature as well as high mechanical strength of the generated nanometer structures that have to serve as mold in the subsequent process. A high degree of transparency for UV-radiation is highly beneficial.

In an example of a combined heat and radiation the polymer foil, corresponding to 3 in FIG. 1, to which the template pattern is to be transferred needs to be UV-transparent. A UV-cross-linkable polymer, e.g. a negative photoresist such as SU8 from MicroChem, USA, is spin-coated onto the polymer foil. the template 1 and the coated polymer foil are brought together and covered by an imprint membrane over the polymer foil. After heating to the imprint temperature the latter is held constant during the entire rest of the imprint process to eliminate thermal expansion effects. The sandwich is now pressurized and after a typical flow time, e.g. 30 seconds, the polymer is cross-liked by UV-radiation followed by a post exposure bake of e.g. 30 seconds. No cooling is required, and the pressure can now be released directly followed by removal of imprint membrane and demolding. Again, a good negative photoresist loses its UV-absorbing properties after exposure.

Dependent on the specific process used, i.e. thermal, UV or combined thermal and UV at constant temperature, template 1 and the imprinted polymer foil 3 can be separated either after cooling or without cooling of the polymer foil after the performed imprint process depending on the chosen material and its properties. After release of the template 1 from the polymer surface 4, the imprinted polymer foil 3, also called the replica, displayed in FIG. 1*c*) having a pattern in its surface 4 which is inverted or negative to that of the original template 1, can be used as a flexible polymer stamp 5.

In accordance with the invention, polymer stamp 5 is either used in the secondary step to transfer the pattern of surface 4 to a target substrate, or it is used in an additional primary step to produce a second inversed replica into another flexible polymer foil 6 according to FIGS. 1*d*) to 1*f*), in a similar process as described above. A purpose behind employing a further primary step is to ensure that the final pattern to be created in the target substrate is to be an inverse of the template surface pattern. In such embodiment, a polymer foil 6 is used which is to be composed by a polymer, whose glass transition temperature and imprint temperature is lower than that of the flexible polymer stamp 5. Furthermore, the engaging surfaces 4 and 7 of polymer foil 6 and flexible polymer stamp 5 exhibit anti-adhesion properties against to each other. Anti-adhesion properties could be present from the beginning due to the chemical nature of the used polymer foils and/or be implemented by the deposition of anti-adhesion layers comprising suitable release agents on one or both polymer surfaces. Additionally, if the polymer foil 6 should be cross-linked after exposure to radiation at least one of the polymer foils 5 and 6 must be transparent to the applied radiation or alternatively transmit enough radiation to enable a cross-linking of the surface layer of foil 6, or the entire foil 6 if it is massive.

Creation of a new polymer stamp 8, which is inverted from the first polymer stamp 5 and thus substantially identical to template 1, with regard to the pattern, includes placing polymer stamp 5 with its patterned surface 4 facing and in contact with a surface 7 of the second polymer foil 6. As before, second polymer foil 6 may be massive or have a carrier sheet to which a surface layer is applied at surface 7. In order to be able to imprint the pattern of surface 4 in the surface layer of foil 6, foil 6 is heated above the glass transition temperature of its surface layer if a thermal imprint process is used. As shown in FIG. 1*e*), pressure is then applied to press the first polymer stamp 5 into the surface layer of polymer foil 6. After performing the imprint the flexible polymer stamp 5 can be removed from the polymer foil 6 mechanically, i.e. mostly after cooling the polymer foil 6, or alternatively the whole stamp 5 or portions of it can be dissolved chemically with the help of one or more suitable solvents in a suitable process. The result is a new polymer stamp 8 with a surface 7 having a pattern corresponding to that of the original template 1.

The so-produced replicas 5 or 8 having inverted or identical surface patterns to that of the original template 1, respectively, will be used as flexible polymer templates in a secondary imprint step according to the invention, as schematically illustrated in FIGS. 1*g*) to 1*i*) on the left hand side and the right hand side, respectively. Here, surfaces 4 or 7 of one of the flexible polymer stamps 5 or 8 will be placed in contact with a surface 16 of an object 12 comprising a substrate 13 having a target surface 17 covered by a thin moldable surface layer 14 of a radiation-sensitive material, e.g. a pre-polymer or a polymer which is cross-linkable with the help of the exposure to radiation. Surface 4 or 7 of the flexible polymer stamp 5 or 8 exhibit anti-adhesion properties against surface 16 of the moldable layer 14, due to the material compositions of the surfaces. With the help of an applied pressure forcing one of the flexible polymer templates 5 or 8 and object 12 together and applied exposure of selected portions of the polymer film 14 to radiation, an inversion of the pattern of the polymer stamp surfaces is formed in the moldable layer 14, as shown in FIG. 1*h*. The flexible polymer stamp 5 or 8 is transparent to the applied radiation or shows minor absorbance in order to transmit a sufficient amount of radiation necessary for curing or cross-linking the material of surface layer 14 upon exposure to radiation. After performed imprint and post-baking as shown in FIG. 1*h*), the flexible polymer stamp 5 or 8 can be removed from the substrate 13 mechanically or, alternatively the whole polymer stamp 5 or 8 or portions of it can be dissolved chemically with the help of one or more suitable solvents in a suitable process.

FIG. 1*i*) shows the resulting imprinted object 12 after release of the flexible polymer stamp 5 or 8. In order to permanently affix the transferred pattern to the substrate, further processing steps are typically employed to remove the thinnest portions of the remaining film 14 to expose the target surface 17 of the substrate, and then to either etch the target surface or plate it with another material. The actual details of this further processing are not important for understanding of the invention, though.

FIG. 1 is a relatively simple representation of the process according to the invention. The primary step, depicted above the dashed line, may be performed using thermal imprint directly in the massive polymer foil, UV-assisted imprint using a pre-polymer surface layer on the polymer foil, or simultaneous UV radiation at a controlled elevated temperature using a UV cross-linkable polymer surface layer on the polymer foil. If thermal imprint is used in steps 1*a*) to 1*c*), there will typically be a difference in the thermal expansion between template 1, which e.g. may be nickel, and the polymer foil 3. However, the resiliency and flexibility of polymer foil 3, which furthermore has a thickness which is substantially larger than the height of the pattern structures, guarantees that the polymer foil is stretched and contracted by the thermal expansion imposed on template 1, without damaging the pattern features on the foil surface 4. The thickness of the polymer foil is typically in the range of 50-500 μm, whereas the height or depth of the pattern structures is in the range of 5 nm to 20 μm, as will be shown by means of examples below. Other sizes are possible though.

However, the second step depicted below the dashed line in FIG. 1 is preferably performed using combined heat and radiation. The reason for this is that when imprint is to be performed on the substrate, the remaining or residual surface layer on the target surface of the substrate is generally extremely thin, in the order of a few nanometers. Heating and cooling a sandwiched pair of stamp and polymer having different thermal expansion, will therefore often be devastating to fine structures, which tend to be completely ripped off. However, thanks to the process according to the invention, where the steps of pressing, radiating and postbaking are all performed at a controlled constant temperature, thermal expansion effects are eliminated.

Figure 5:
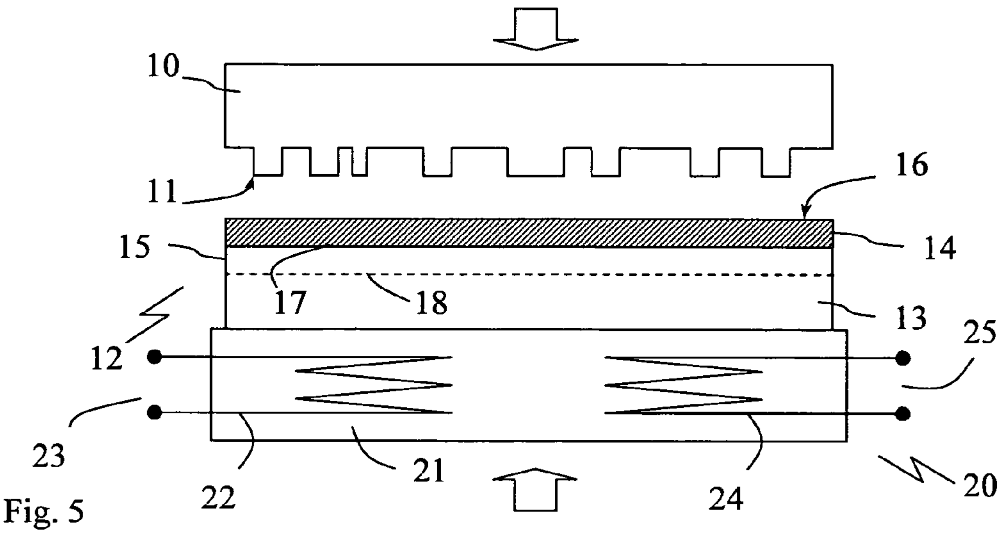
FIGS. 5-7 illustrates process steps of an embodiment of the invention.
Figure 6:
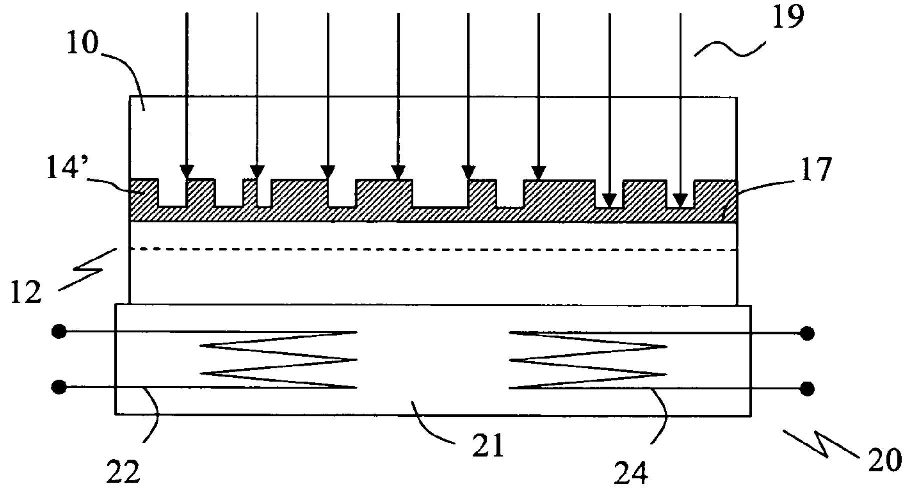
Figure 7:
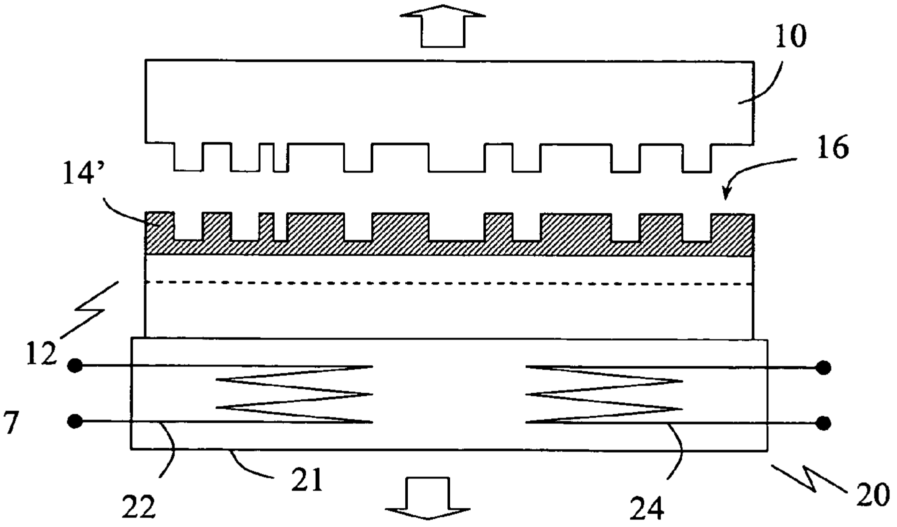

FIGS. 5-7 schematically present the basic process steps of the actual pattern transfer steps, or imprint steps, in the secondary step of an embodiment of the invention. These drawings correspond to FIGS. 1*g*) to 1*h*), either the left hand side example or the right hand side example, but in greater detail.

In FIG. 5 a polymer stamp 10 is illustrated, which consequently may correspond to either polymer stamp 5 or 8 in FIG. 1. Polymer stamp 10 has a structured surface 11, corresponding to surface 4 or 7, with a predetermined pattern to be transferred, in which three-dimensional protrusions and recesses are formed with a feature size in height and width within a range of 1 nm to several μm, and potentially both smaller and larger. The thickness of polymer stamp 10 is typically between 10 and 1000 μm. A substrate 12 has a target surface 17 which is arranged substantially parallel to polymer stamp surface 11, with an intermediate spacing between the surfaces at the initial stage shown in FIG. 5. The substrate 12 comprises a substrate base 13, to which the pattern of polymer stamp surface 11 is to be transferred. Though not shown, the substrate may also include a support layer below the substrate base 13. In a process where the pattern of polymer stamp 10 is to be transferred to substrate 12 directly through an imprint in a polymer material, said material may be applied as a surface layer 14 directly onto the substrate target surface 17. In alternative embodiments, indicated by the dashed line, a transfer layer 15 is also employed, of e.g. a second polymer material. Examples of such transfer layers, and how they are used in the subsequent process of transferring the imprinted pattern to the substrate base 13, are described in U.S. Pat. No. 6,334,960. In an embodiment including a transfer layer 15, target surface 17 denotes the upper or outer surface of the transfer layer 15, which in turn is arranged on the substrate base surface 18.

Substrate 12 is positioned on a heater device 20. Heater device 20 preferably comprises a heater body 21 of metal, e.g. aluminum. A heater element 22 is connected to or included in heater body 21, for transferring thermal energy to heater body 21. In one embodiment, heater element 22 is an electrical immersion heater inserted in a socket in heater body 21. In another embodiment, an electrical heating coil is provided inside heater body 21, or attached to a lower surface of heater body 21. In yet another embodiment, heating element 22 is a formed channel in heater body 21, for passing a heating fluid through said channel. Heater element 22 is further provided with connectors 23 for connection to an external energy source (not shown). In the case of electrical heating, connectors 23 are preferably galvanic contacts for connection to a current source. For an embodiment with formed channels for passing a heating fluid, said connectors 23 are preferably conduits for attachment to a heated fluid source. The heating fluid may e.g. be water, or an oil. Yet another option is to employ an IR radiation heater as a heater element 22, devised to emit infrared radiation onto heater body 21. Furthermore, a temperature controller is included in heater device 20 (not shown), comprising means for heating heater element 22 to a selected temperature and maintaining that temperature within a certain temperature tolerance. Different types of temperature controllers a well known within the art, and are therefore not discussed in further detail.

Heater body 21 is preferably a piece of cast metal, such as aluminum, stainless steel, or other metal. Furthermore, a body 21 of a certain mass and thickness is preferably used such that an even distribution of heat at an upper side of heater device 20 is achieved, which upper side is connected to substrate 12 for transferring heat from body 21 through substrate 12 to heat layer 14. For an imprint process used to imprint 2.5" substrates, a heater body 21 of at least 2.5" diameter, and preferably 3" or more, is used, with a thickness of at least 1 cm, preferably at least 2 or 3 cm. For an imprint process used to imprint 6" substrates, a heater body 21 of at least 6" diameter, and preferably 7" or more, is used, with a thickness of at least 2 cm, preferably at least 3 or 4 cm. Heater device 20 is preferably capable of heating heater body 21 to a temperature of up to 200-300° C., though lower temperatures will be sufficient for most processes.

For the purpose of providing controlled cooling of layer 14, heater device 20 may further be provided with a cooling element 24 connected to or included in heater body 21, for transferring thermal energy from heater body 21. In a preferred embodiment, cooling element 24 comprises a formed channel or channels in heater body 21, for passing a cooling fluid through said channel or channels. Cooling element 24 is further provided with connectors 25 for connection to an external cooling source (not shown). Preferably, said connectors 25 are conduits for attachment to a cooling fluid source. Said cooling fluid is preferably water, but may alternatively be an oil, e.g. an insulating oil.

A preferred embodiment of the invention makes use of a radiation cross-linkable thermoplastic polymer solution material for layer 14, which preferably is spin-coatable. These polymer solutions may also be photo chemically amplified. An example of such a material is mr-L6000.1 XP from Micro Resist Technology, which is UV cross-linkable. Other examples of such radiation cross-linkable materials are negative photo-resist materials like Shipley ma-N 1400, SC100, and MicroChem SU-8. A material which is spin-coatable is advantageous, since it allows complete and accurate coating of an entire substrate.

Another embodiment makes use of a liquid or near liquid pre-polymer material for layer 14, which is polymerizable by means of radiation. Examples of available and usable polymerizable materials for layer 14 comprise NIP-K17, NIP-K22, and NIP-K28 from ZEN Photonics, 104-11 Moonj i-Dong, Yusong-Gu, Daejeon 305-308, South Korea. NIP-K17 has a main component of acrylate, and has a viscosity at 25° C. of about 9.63 cps. NIP-K22 also has a main component of acrylate, and a viscosity at 25° C. of about 5.85 cps. These substances are devised to cure under exposure to ultraviolet radiation above 12 $mW/cm^2$ for 2 minutes. Another example of an available and usable polymerizable material for layer 14 is Ormocore from Micro Resist Technology GmbH, Koepenicker Strasse 325, Haus 211, D-12555 Berlin, Germany. This substance has a composition of inorganic-organic hybrid polymer, unsaturated, with a 1-3% photopolymerisation initiator. The viscosity of 3-8 mPas at 25° C. is fairly high, and the fluid may be cured under exposure of radiation with 500 $mJ/cm^2$ at a wavelength of 365 nm. Other usable materials are mentioned in U.S. Pat. No. 6,334,960.

Common for all these materials, and any other material usable for carrying out the invention, is that they are moldable and have the capability to solidify when exposed to radiation, particularly UV radiation, e.g. by cross-linking of polymer solution materials or curing of pre-polymers.

The thickness of layer 14 when deposited on the substrate surface is typically 10 nm-10 μm, depending on application area. The curable or cross-linkable material is preferably applied in liquid form onto substrate 12, preferably by spin coating, or optionally by roller coating, dip coating or similar. One advantage with the present invention compared to prior art step and flash methods, typically when using a cross-linkable polymer material, is that the polymer material may be spin coated on the entire substrate, which is an advantageous and fast process offering excellent layer evenness. Cross-linkable materials, such as those mentioned, are typically solid at normal room temperature, and a substrate which has been pre-coated at an elevated temperature may therefore conveniently be used. The step and flash method, on the other hand, has to use repeated dispensation on repeated surface portions, since that method is incapable of handling large surfaces in single steps. This makes both the step and flash process and the machine for carrying out such a process complex, time consuming in terms of cycle time, and hard to control.

The arrows of FIG. 5 illustrate that the polymer stamp surface 11 is pressed into surface 16 of the moldable material layer 14. At this step, heater device 20 is preferably used to control the temperature of layer 14, for obtaining a suitable fluidity in the material of layer 14. For a cross-linkable material of layer 14, heater device 20 is therefore controlled to heat layer 14 to a temperature $T_p$ exceeding the glass temperature $T_g$ of the material of layer 14. In this context, $T_p$ stands for process temperature or imprint temperature, indicating that it is one temperature level common for the process steps of imprint, exposure, and postbaking. The level of constant temperature $T_p$ is of course dependent on the type of material chosen for layer 14, since it must exceed the glass transition temperature $T_g$ for the case of a cross-linkable material and also be suitable for postbaking the radiation-cured material of the layer. For radiation cross-linkable materials $T_p$ typically ranges within 20-250° C., or even more often within 50-250° C. For the example of mr-L6000.1 XP, successful tests have been performed with a constant temperature throughout imprint, exposure and postbake of 100-120° C. For embodiments using radiation-curable pre-polymers, such materials are typically liquid or near liquid in room temperature, and therefore need little or no heating to become soft enough for imprinting. However, also these materials must generally go through post-baking for complete hardening after exposure, prior to separation from the polymer stamp. The process temperature $T_p$ is therefore set to a suitable post-baking temperature level already in the imprint step beginning at the step of FIG. 5.

FIG. 6 illustrates how the structures of polymer stamp surface 11 has made an imprint in the material layer 14, which is in fluid or at least soft form, at which the fluid has been forced to fill the recesses in polymer stamp surface 11. In the illustrated embodiment, the highest protrusions in polymer stamp surface 11 do not penetrate all the way down to substrate surface 17. This may be beneficial for protecting the substrate surface 17, and particularly the polymer stamp surface 11, from damage. However, in alternative embodiments, such as one including a transfer layer, imprint may be performed all the way down to transfer layer surface 17. In the embodiment illustrated in FIGS. 5-7, the polymer stamp is made from a material which is transparent to radiation 19 of a predetermined wavelength or wavelength range, which is usable for solidifying a selected moldable material. Such materials may e.g. be polycarbonate, COC or PMMA. For polymer stamps created using radiation as described above, the remaining layer of the radiation-sensitive surface layer in which the pattern is formed is preferably also transparent to UV radiation, or alternatively so thin that its UV absorption is low enough to let through a sufficient amount of radiation. Radiation 19 is typically applied when polymer stamp 10 has been pressed into layer 14 with a suitable alignment between polymer stamp 10 and substrate 12. When exposed to this radiation 19, solidification of the moldable material is initiated, for solidification to a solid body 14' taking the shape determined by the polymer stamp 10. During the step of exposing layer 14 to radiation, heater 20 is controlled by the temperature controller to maintain the temperature of layer 14 at temperature $T_p$.

After exposure to radiation, a postbaking step is performed, to completely harden the material of layer 14'. In this step, heater device 20 is used to provide heat to layer 14', for baking layer 14' to a hardened body before separation of polymer stamp 10 and substrate 12. Furthermore, postbaking is performed by maintaining the aforementioned temperature $T_p$. This way, polymer stamp 10 and material layer 14, 14' will maintain the same temperature from the beginning of solidification of material 14 by exposure to radiation, to finalized postbaking, and optionally also through separation of polymer stamp 10 and substrate 12. This way, accuracy limitations due to differences in thermal expansion in any of the materials used for the substrate and the polymer stamp are eliminated.

The polymer stamp 10 is e.g. removed by a peeling and pulling process, as illustrated in FIG. 7, or by dissolving the polymer stamp in a bath of a solution which dissolves the material of the polymer stamp but not the substrate or material layer 14. The formed and solidified polymer layer 14' remains on the substrate 12. The various different ways of further processing of the substrate and its layer 14' will not be dealt with here in any detail, since the invention as such is neither related to such further processing, nor is it dependent on how such further processing is achieved. Generally speaking, further processing for transferring the pattern of polymer stamp 10 to the substrate base 13 may e.g. include etching or plating, possibly followed by a lift-off step.

Figure 8:
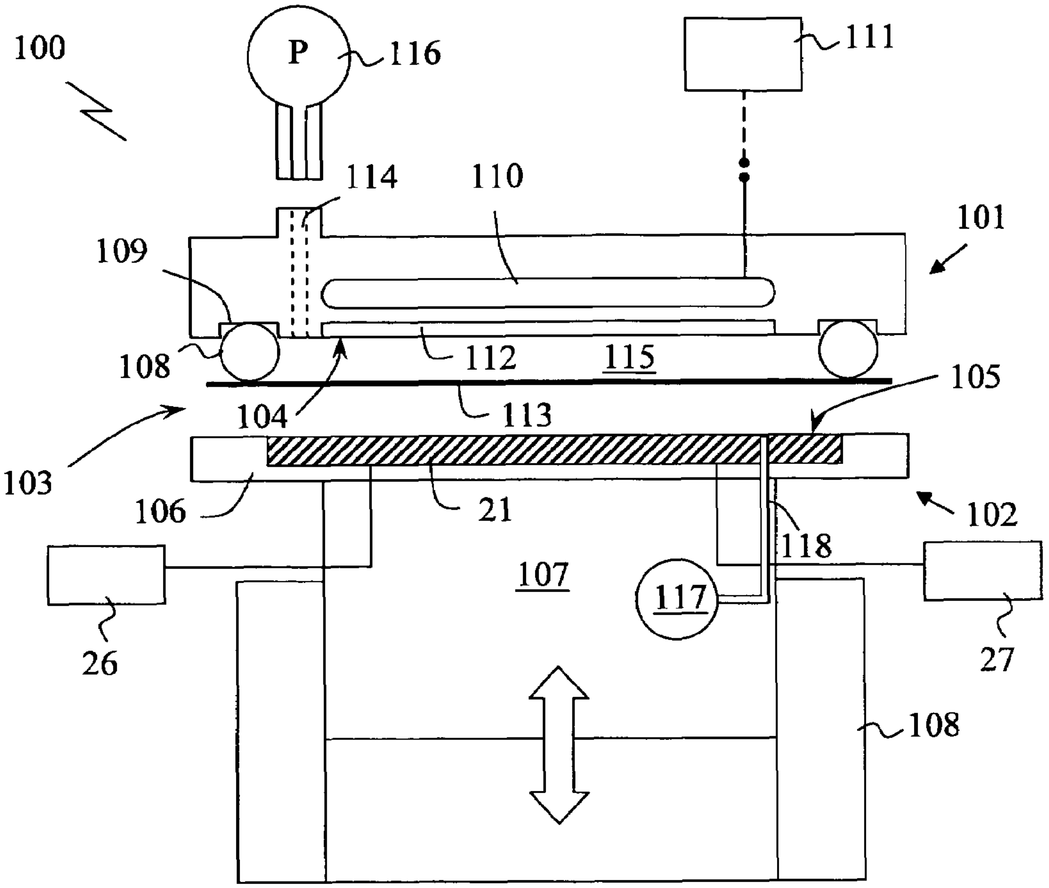
FIG. 8 schematically illustrates an embodiment of an imprint unit according to the invention, for performing the process as generally described in FIGS. 1-3 or 5-7.

FIG. 8 schematically illustrates a preferred embodiment of an imprint unit comprised in an apparatus according to the present invention. The apparatus, which comprises two or more imprint units, may comprise different types of imprint units or identical imprint units, and even if they are identical they are advantageously operated under different conditions. For one thing, if a polymer foil is imprinted in the first imprint unit in a thermal process, the imprint temperature in that unit is higher than the glass transition temperature of the polymer foil. In the second imprint unit, to which the imprinted polymer foil is brought to act as an intermediate stamp, the imprint temperature is controlled to be lower than the glass transition temperature of the polymer foil. However, the drawings of FIGS. 8-10 may represent either a first imprint unit devised for the first imprint step, a second imprint unit for a second imprint step, or even an intermediate imprint unit for carrying out the process steps of FIG. **1*d*-1*f*. It should be noted that the drawing of FIG. 8** is purely schematic, for the purpose of clarifying the different features thereof. In particular, dimensions of the different features are not on a common scale.

The imprint unit 100 comprises a first main part 101 and a second main part 102. In the illustrated preferred embodiment these main parts are arranged with the first main part 101 on top of second main part, with an adjustable spacing 103 between said main parts. When making a surface imprint by a process as illustrated in FIGS. 5-7, it may be of great importance that the template and the substrate are properly aligned in the lateral direction, typically called the X-Y plane. This is particularly important if the imprint is to be made on top of or adjacent to a previously existing pattern in the substrate. However, the specific problems of alignment, and different ways of overcoming them, are not addressed herein, but may of course be combined with the present invention when needed.

The first, upper, main part 101 has a downwards facing surface 104, and the second, lower, main part 102 has an upwards facing surface 105. Upwards facing surface 105 is, or has a portion that is, substantially flat, and which is placed on or forms part of a plate 106 which acts as a support structure for a template or a substrate to be used in an imprint process, as will be more thoroughly described in conjunction with FIGS. 9 and 10. A heater body 21 is placed in contact with plate 106, or forms part of plate 106. Heater body 21 forms part of a heater device 20, and includes a heating element 22 and preferably also a cooling element 24, as shown in FIGS. 5-7. Heating element 22 is connected through connectors 23 to a energy source 26, e.g. an electrical power supply with current control means. Furthermore, cooling element 24 is connected through connectors 25 to a cooling source 27, e.g. a cooling fluid reservoir and pump, with control means for controlling flow and temperature of the cooling fluid.

Means for adjusting spacing 103 are, in the illustrated embodiment, provided by a piston member 107 attached at its outer end to plate 106. Piston member 107 is displaceably linked to a cylinder member 108, which preferably is held in fixed relation to first main part 101. In a preferred embodiment, piston member 107 may pivot to a certain extent in its suspension in cylinder member 108, in order to automatically assume parallelism between surfaces 104 and 105 when brought together in the imprint process. As is indicated by the arrow in the drawing, the means for adjusting spacing 103 are devised to displace second main part 102 closer to or farther from first main part 101, by means of a movement substantially perpendicular to the substantially flat surface 105, i.e. in the Z direction. Displacement may be achieved manually, but is preferably assisted by employing either a hydraulic or pneumatic arrangement. The illustrated embodiment may be varied in a number of ways in this respect, for instance by instead attaching plate 106 to a cylinder member about a fixed piston member. It should further be noted that the displacement of second main part 102 is mainly employed for loading and unloading the imprint unit 100 with a template and a substrate, and for arranging the imprint unit in an initial operation position. The movement of second main part 102 is, however, preferably not included in the actual imprint process as such in the illustrated embodiment, as will be described.

First main part 101 comprises a peripheral seal member 108, which encircles surface 104. Preferably, seal member 108 is an endless seal such as an o-ring, but may alternatively be composed of several interconnected seal members which together form a continuous seal 108. Seal member 108 is disposed in a recess 109 outwardly of surface 104, and is preferably detachable from said recess. The imprint unit further optionally may comprise a radiation source 110, in the illustrated embodiment disposed in the first main part 101 behind surface 104. Radiation source 110 is connectable to a radiation source driver 111, which preferably comprises or is connected to a power source (not shown). Radiation source driver 111 may be included in the imprint unit 100, or be an external connectable member. A surface portion 112 of surface 104, disposed adjacent to radiation source 110, is formed in a material which is transparent to radiation of a certain wavelength or wavelength range of radiation source 110, preferably UV radiation. This way, radiation emitted from radiation source 110 is transmitted towards spacing 103 between first main part 101 and second main part 102, through said surface portion 112. Surface portion 112, acting as a window, may be formed in available fused silica, quartz, or sapphire.

One embodiment of the imprint unit 100 further comprises mechanical clamping means, for clamping together a substrate and a stamp (not shown). This is particularly preferred in an embodiment with an external alignment system for aligning substrate and stamp prior to pattern transfer, where the aligned stack comprising the stamp and the substrate has to be transferred into the imprint unit. In one embodiment, a template holding device is included (not shown) for securing a template to surface 105. This may be a mechanical template retaining member, such as a chuck or a set of hooks securely holding the template or a template carrier to surface 105. Furthermore, the template holding device may additionally or optionally comprise a vacuum supply source, a conduit connected between the vacuum supply source and an orifice in surface 105, and a seal provided around the orifice. When the template is placed onto surface 105 such that it covers the seal, and vacuum is supplied, the template is held by suction. Typically, both a mechanical holder and a vacuum holder are included, where the first securely holds the template in a process of releasing or demolding an imprinted polymer stamp, and where the vacuum holder is used to securely position the template during the actual imprint process.

In operation, imprint unit 100 is further provided with a flexible membrane 113, which is substantially flat and engages seal member 108. In one embodiment, seal member 113 is a separate member from seal member 108, and is only engaged with seal member 108 by applying a counter pressure from surface 105 of plate 106, as will be explained. However, in an alternative embodiment, membrane 113 is attached to seal member 108, e.g. by means of a cement, or by being an integral part of seal member 108. In such an embodiment, a centre portion, wide enough to completely overlap a template for which the imprint unit is configured to be used with, may be substantially rigid, e.g. by attaching a rigid plate thereto. Furthermore, in such an alternative embodiment, membrane 113 may be firmly attached to main part 101, whereas seal 108 is disposed outwardly of membrane 113. For an embodiment such as the one illustrated, also membrane 113 is formed in a material which is transparent to radiation of a certain wavelength or wavelength range of radiation source 110. This way, radiation emitted from radiation source 110 is transmitted into spacing 103 through said cavity 115 and its boundary walls 104 and 113. Examples of usable materials for membrane 113, for the embodiment of FIGS. 7-9, include polycarbonate, polypropylene, polyethylene, PDMS and PEEK. The thickness of membrane 113 may typically be 10-500 μm. In a thermal imprint process as described, a combination of membrane material and polymer foil material should be selected such that an imprint temperature exceeding the glass transition temperature of the polymer foil does not exceed a glass transition temperature of the membrane.

The imprint unit 100 further preferably comprises means for applying a vacuum between stamp and substrate in order to extract air inclusions from the moldable layer of the stacked sandwich prior to hardening of the layer through UV irradiation. This is exemplified in FIG. 8 by a vacuum pump 117, communicatively connected to the space between surface 105 and membrane 113 by a conduit 118.

A conduit 114 is formed in first main part 101 for allowing a fluid medium, either a gas, a liquid or a gel, to pass to a space defined by surface 104, seal member 108 and membrane 113, which space acts as a cavity 115 for said fluid medium.

Conduit 114 is connectable to a pressure source 116, such as a pump, which may be an external or a built in part of imprint unit 100. Pressure source 116 is devised to apply an adjustable pressure, in particular an overpressure, to a fluid medium contained in said cavity 115. An embodiment such as the one illustrated is suitable for use with a gaseous pressure medium. Preferably, said medium is selected from the group containing air, nitrogen, and argon. If instead a gel or a liquid medium is used, such as an hydraulic oil, it is preferred to have the membrane attached to seal member 108.

Figure 9:
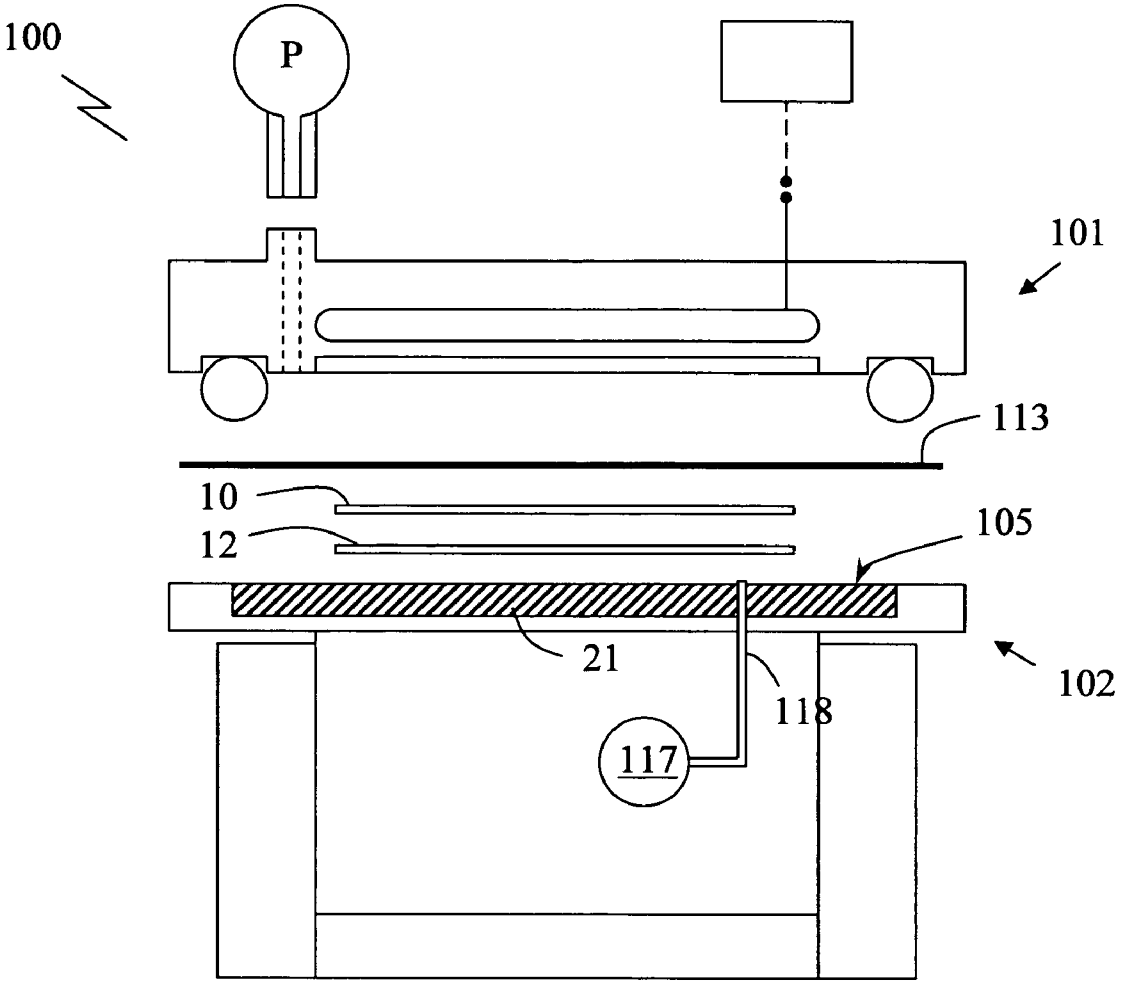
FIG. 9 schematically illustrates the imprint unit of FIG. 8, when loaded with a polymer stamp and a substrate at an initial step of the process.

FIG. 9 illustrates the imprint unit embodiment of FIG. 8, when being loaded with two imprint objects. The imprint unit 100 of FIG. 9 will now be described as being the second imprint unit, i.e. the imprint unit in which the imprinted intermediate disc is subsequently used as a stamp for imprint in a target surface of a substrate. A substrate 12 and a polymer stamp 10 are placed in the spacing 103 between main part 101 and main part 102, which constitute cooperating members. For better understanding of this drawing, reference is also made to FIGS. 5-7. Second main part 102 has been displaced downwards from first main part 101, for opening up spacing 103. The illustrated embodiment of FIG. 9 shows an imprint unit loaded with a transparent polymer stamp 10 on top of a substrate 12. Substrate 12 is placed with a backside thereof on surface 105 of heater body 21, placed on or in the second main part 102. Thereby, substrate 12 has its target surface 17 with the layer 14 of a polymerizable material, e.g. a UV cross-linkable polymer, facing upwards. For the sake of simplicity, all features of heater device 20, as seen in FIGS. 5-7 are not shown in FIG. 9. Polymer stamp 10 is placed on or adjacent to substrate 12, with its structured surface 11 facing substrate 12. Means for aligning polymer stamp 10 with substrate 12 may be provided, but are not illustrated in this schematic drawing. Membrane 113 is then placed on top of polymer stamp 10. For an embodiment where membrane 113 is attached to the first main part, the step of actually placing membrane 113 on the polymer stamp is, of course, dispensed with. Furthermore, in an alternative embodiment the polymer stamp 113 may act as membrane. In such an embodiment, no separate membrane 113 is employed, instead the seal 108 is placed directly in contact with the polymer foil. Preferably, the polymer foil in such an embodiment has a substantially larger diameter than substrate 12, such that the polymer foil extends beyond the orifice of conduit 118, and such that polymer foil 10 is pressed between seal 108 and surface 105, in order not to place mechanical pressure from the seal 108 over the substrate 12. In FIG. 9 polymer stamp 10, substrate 12 and membrane 113 are shown completely separated for the sake of clarity only, whereas in a real situation they would be stacked on surface 105.

Figure 10:
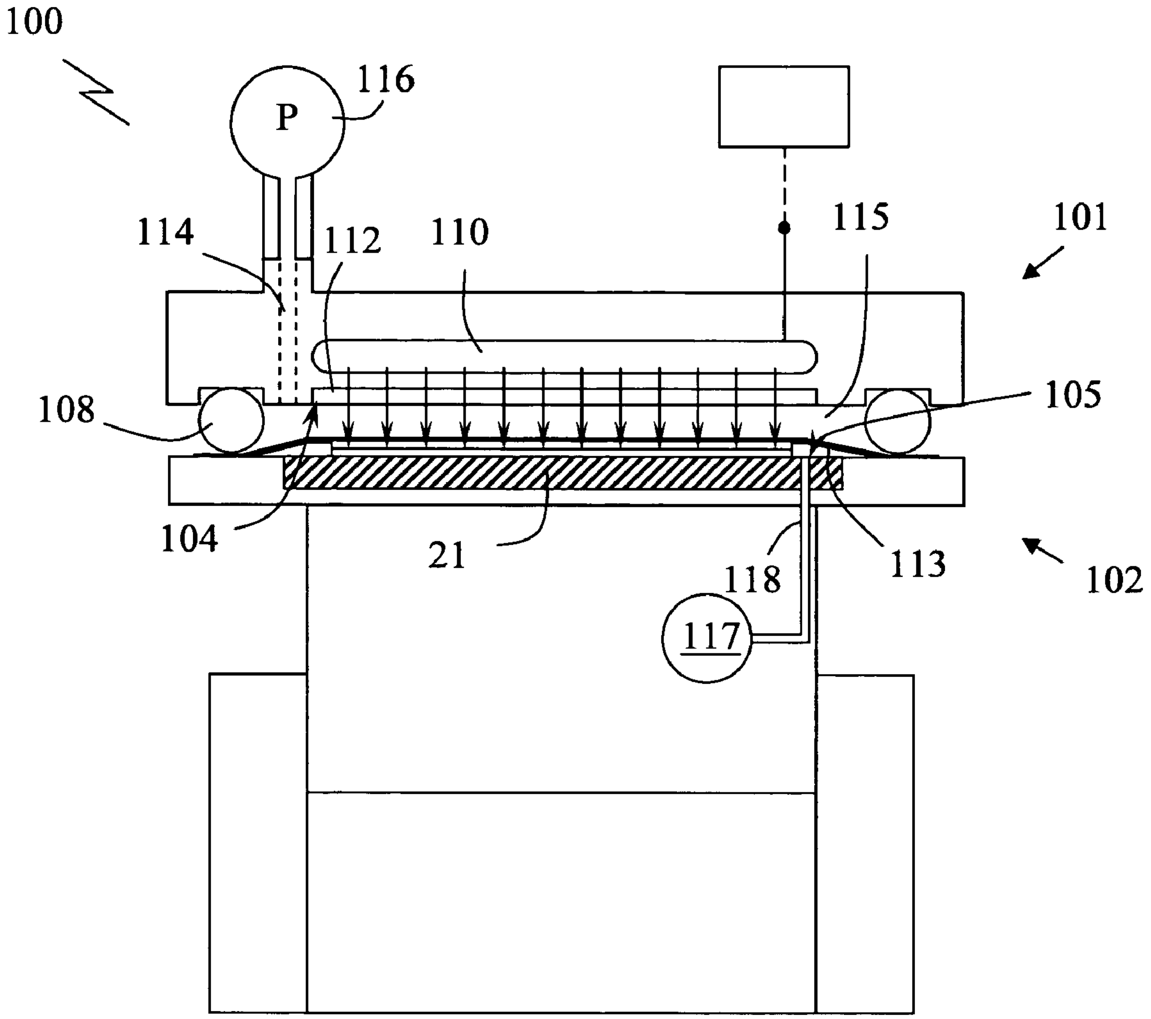
FIG. 10 illustrates the imprint unit of FIGS. 8 and 9, at an active process step of transferring a pattern from one object surface to another object surface.

FIG. 10 illustrates an operative position of the second imprint unit 100 as described in conjunction with FIG. 9. Second main part 102 has been raised to a position where membrane 113 is clamped between seal member 108 and surface 105. In reality, both polymer stamp 10 and substrate 12 are very thin, typically only parts of a millimeter, and the actual bending of membrane 113 as illustrated is minimal. Still, surface 105 may optionally be devised with a raised peripheral portion at the point where it contacts seal member 108 through membrane 113, for compensating for the combined thickness of polymer stamp 10 and substrate 12.

Once main parts 101 and 102 are engaged to clamp membrane 113, cavity 115 is sealed. Vacuum is applied by suction from vacuum pump 117 to extract air inclusions from the surface layer of the substrate 12. Pressure source 116 is then devised to apply an overpressure to a fluid medium in cavity 115, which may be a gas, a liquid or a gel. The pressure in cavity 115 is transferred by membrane 113 to polymer stamp 10, which is pressed towards substrate 12 for imprinting the polymer stamp pattern in layer 14, cf. FIG. 6. Cross-linkable polymer solutions typically need pre-heating to overcome its glass transition temperature $T_g$, which may be about 60° C. An example of such a polymer is the afore mr-L6000.1 XP. When using such polymers, the imprint unit 100, having combined radiation and heating capabilities, is particularly useful. However, for both these types of materials a post-baking step is generally needed to harden the radiation-solidified layer 14'. As previously mentioned, an aspect of the invention is therefore to apply a raised temperature $T_p$ to the material of layer 14, which is higher than $T_g$ for the case of a cross-linkable material, and also suitable for postbaking of the radiation-exposed material. Heater device 20 is activated to heat layer 14 through substrate 12, by means of heater body 21, until $T_p$ has been reached. The actual value of $T_p$ is naturally dependent on the material chosen for layer 14. For the example of mr-L6000.1 XP, a temperature $T_p$ within the range of 50-150° C. may be used, dependent on the molecular weight distribution in the material. The pressure of the medium in cavity 115 is then increased to 5-500 bar, advantageously to 5-200 bar, and preferably to 20-100 bar. Polymer stamp 10 and substrate 12 are thereby pressed together with a corresponding pressure. Thanks to flexible membrane 113, an absolutely even distribution of force is obtained over the whole of the contact surface between the substrate and the polymer stamp. The polymer stamp and the substrate are thereby made to arrange themselves absolutely parallel in relation to one another and, the influence of any irregularities in the surface of the substrate or polymer stamp being eliminated.

When polymer stamp 10 and substrate 12 have been brought together by means of the applied fluid medium pressure, radiation source is triggered to emit radiation 19. The radiation is transmitted through surface portion 112, which acts as a window, through cavity 115, membrane 113, and polymer stamp 10. The radiation is partly or completely absorbed in layer 14, the material of which thereby is solidified by cross-linking or curing in the perfectly parallel arrangement between polymer stamp 10 and substrate 12, provided by the pressure and membrane assisted compression. Radiation exposure time is dependent on the type and amount of material in layer 14, the radiation wavelength combined with the type of material, and of the radiation power. The feature of solidifying such a polymerizable material is well known as such, and the relevant combinations of the mentioned parameters are likewise known to the skilled person. Once the fluid has solidified to form a layer 14', further exposure has no major effect. However, after exposure the material of layer 14' is allowed to post bake, or hard bake, at the predetermined constant temperature $T_p$ for a certain time period of e.g. 1-10 minutes, if postbaking is at all necessary to solidify the layer. For the example of mr-L6000.1 XP, postbaking is typically performed for 1-10 minutes, preferably about 3 minutes, at the common process temperature $T_p$ of 100-120° C. For SU8, the time of exposure to radiation is between 1 and 10 seconds, where the range of 3-5 seconds has been successfully tested, and postbaking is then performed at a $T_p$ of about 70° C. for 30-60 seconds.

With the imprint unit 100 according to the present invention, post-baking may be performed in the imprint machine 100, which means that it is not necessary to bring the substrate out of the imprint unit and into a separate oven. This saves one process step, which makes both time and cost savings possible in the imprint process. By performing the post-baking step while the polymer stamp 10 is still held at a constant temperature $T_p$, and potentially also with the selected pressure towards substrate 10, and, higher accuracy in the resulting structure pattern in layer 14 is also achieved, which makes it possible to produce finer structures. Following compression, exposure and post-baking, the pressure in cavity 115 is reduced and the two main parts 101 and 102 are separated from one another. After this, the substrate is separated from the polymer stamp and subjected to further treatment according to what is previously known for imprint lithography.

A first mode of the invention involves a substrate 12 of silicon covered by a layer 14 of NIP-K17 with a thickness of 1 μm. After compression by means of membrane 113 with a pressure of 5-100 bar for about 30 seconds, radiation source 110 is turned on. Radiation source 110 is typically devised to emit at least in the ultraviolet region below 400 μm. In a preferred embodiment, an air-cooled xenon lamp with an emission spectrum ranging from 200-1000 nm is employed as the radiation source 110. The preferred xenon type radiation source 110 provides a radiation of 1-10 W/cm$^2$, and is devised to flash 1-5 μs pulses, with a pulse rate of 1-5 pulses per second. A window 112 of quartz is formed in surface 104 for passing through radiation. Exposure time is preferably between 1-30 seconds, for polymerizing fluid layer 14 into a solid layer 14', but may be up to 2 minutes.

Tests with mr-L6000.1 XP have been performed with about 1.8 W/cm$^2$ integrated from 200-1000 nm, with 1 minute exposure time. It should, in this context, be noted that the radiation used need not be restricted to a wavelength range within which the polymer applied in layer 14 solidifies, radiation outside that range may of course also be emitted from the radiation source used. After successful exposure and subsequent postbaking at a constant process temperature, second main part 102 is lowered to a position similar to that of FIG. 9, following which template 10 and substrate 12 are removed from the imprint unit for separation and further processing of the substrate.

By the term constant temperature is meant substantially constant, meaning that even though a temperature controller is set to maintain a certain temperature, the actual temperature obtained will inevitably fluctuate to a certain extent. The stability of the constant temperature is mainly dependent on the accuracy of the temperature controller, and inertia of the entire setup. Furthermore, it is understood that even though the method according to the invention is usable for imprinting extremely fine structures down to single nanometers, a slight temperature variation will not have a major effect as long as the template is not too large. Assuming that the structures at the periphery of the template has a width x, and a reasonable spatial tolerance is a fraction of that width, such as y=x/10, then y becomes the parameter setting the temperature tolerance. In fact, it can easily be calculated which effect differences in thermal expansion will have, by applying the respective coefficients of thermal expansion for the materials of the template and substrate, the size, typically the radius, of the template, and the spatial tolerance parameter y. From such a calculation, a suitable temperature tolerance for the temperature controller can be calculated and applied to the machine for performing the process.

Advantages of the application of flexible polymer foils within a “two-step” imprint process as described above and displayed in FIG. 1 include the following:

The flexible properties of the used polymer foils alleviate complications of the pattern transfer due to different thermal expansion coefficients of the applied stamp and substrate materials used in the imprint-process. Therefore, the technique offers possibilities to transfer patterns between surfaces of materials characterized by different thermal expansion coefficients. Nevertheless, most polymers used in the application are characterized by quite similar thermal expansion factors typically ranging between 60 and 70×10$^{-6}$ C$^{-1}$ making imprints between two different polymer foils as displayed in FIG. 1*e*) more easy in terms of manufacturing.

The flexible and ductile properties of the used polymer foils prevent the inclusion of air during the imprint between the polymer foil—having either a patterned or non-patterned surface—and the other object—e.g. a substrate covered by a polymer film or a template, comprising silicon, nickel, quartz or a polymer material. If the foil is pressed towards one of these objects as displayed in FIGS. 1*b*, 1*e*, 1*h* the polymer foil is acting like a membrane, pressing the air from the centre of the imprinted area to its edges where it can leave the imprinted region.

Due to the softness of the used polymer foils particles between the polymer foil and the template or object to which it is pressed, as well as pronounced surface roughness of the template or object, evident damages during an imprint process displayed in FIGS. 1*b*), 1*e*) and 1*h*) of either the polymer foil or of one of the involved objects will be prevented.

Due to the high transparency of the used polymer foils to e.g. UV-radiation, also UV-curable polymers can be used during the imprint process described above, even when non-transparent templates and substrates are used.

The very low surface energies of the most of the applied polymer foils lead to pronounced anti-adhesion properties against other materials, making it ideal to apply them in an imprint process. The deposition of additional anti-adhesion layers on low surface energy polymers is in the most cases not necessary making the process described above simple and industrially applicable. Clearly spoken, it is possible to make the polymer replica stamp in an anti-adhesive material.

The process described above and displayed in FIG. 1 is very suitable to produce both positive (the pattern is similar to that of the original template) and negative (the pattern is inverted to that of the original template) replicas if the material properties of the different polymer materials—e.g. glass transition temperature, optical transparency, and curability after exposure to radiation—applied in the process are adapted to each other.

The aging and wear resistance of the used flexible polymer stamps make it possible to apply them several times in the secondary step of the imprint process. Alternatively, the polymer stamps are used only once and are then thrown away. In any case, this enhances the lifetime of the original template 1, which never has to be used for imprint against a hard and non-flexible material.

The flexible and ductile properties of the used polymer foils alleviate demolding of the inflexible stamp or substrate from the flexible foil reducing physical damages on the stamp or the substrate.

Instead of mechanical demolding of the polymer foil from a substrate after performed imprint, the polymer foil can alternatively be chemically dissolved with the help of a suitable solvent. This procedure would be preferred in case of a transfer of patterns having high aspect ratios, i.e. where the depth of a pattern structure is substantially larger than its width, were mechanical demolding could damage the substrate or the stamp.

Not only the pattern on the surface of an original template but also the physical dimension of the original template can easily be transferred into a polymer foil. In some applications the placement of the pattern on the final substrate is critical. For e.g. hard disk drives the pattern should be replicated and aligned to the centre of the disk. Here, the master stamp can be produced with a centre hole. After imprint a relief of the centre hole is formed into the flexible polymer foil, which can be used for aligning the pattern on the foil to the final replicated disk.

A replica generated in a polymer sheet can give access to a novel family development process, which is not executable the common way by nickel-to-nickel plating. Here, the imprinted polymer sheet is first bonded together with a rigid substrate by, e.g., a UV-assisted imprint process. Thereafter the sheet is metallized with a seed layer and electroplated to receive a nickel copy of the original. Many other conversion process are accessible via the described invention.

An embodiment of the apparatus according to the invention will now be described with reference to FIGS. 11-16. Apparatus 400 includes a first imprint unit 200 and a second imprint unit 300. Any or both of the first and second imprint units 200 and 300, respectively may be devised as described with reference to FIGS. 5-10. Elements described with reference to the preceding drawings carry the same reference numerals, but with a first numeral 2 instead of 1 for unit 200, and a first numeral 3 instead of 1 for unit 300. For the sake of simplicity, though, not all elements will be marked in each figure.

First imprint unit 200 comprises a first pair of cooperating support members, main part 201 and main part 202, arranged opposite to one another with an adjustable intermediate first spacing 203. A first press device is included for adjusting the first spacing 203, including a suspension of main part 202 such that it is displaceable towards and away from main part 201. Pure mechanical displacement of second main part 202 may also be used for actually pressing the main parts towards each other, but preferably the actual imprint pressure is provided by fluid pressure and a membrane, as described with reference to FIGS. 8-10.

Similarly, second imprint unit 300 comprises a second pair of cooperating support members, main part 301 and main part 302, arranged opposite to one another with an adjustable intermediate first spacing 303. A second press device is included for adjusting the first spacing 303, including a suspension of main part 302 such that it is displaceable towards and away from main part 301. Again, the imprint pressure may also be accomplished by displacement for pressing the main parts towards each other, but preferably the actual imprint pressure is provided by fluid pressure and a membrane, as described with reference to FIGS. 8-10. The actual imprint process will not be described in detail with reference to FIGS. 11-15, but the processes may include thermal imprint, radiation-assisted imprint, or combined thermal and radiation-assisted imprint.

Cooperating main parts 201 and 202 are suspended in a first support frame 219, and cooperating main parts 301 and 302 are suspended in a second support frame 319. Support frames 219 and 319 are preferably fixed in relation to each other by means of a fixation member, e.g. a set of bolts, either by being directly attached to each other or by both being attached to a common carrier 401. In an alternative embodiment, only one support frame is comprised, in which both the first and the second cooperating main parts are suspended.

A feeder device 410 is operable to move a disc imprinted in the first unit, from the first spacing 203, to the second spacing 303 for use as a stamp in the second imprint unit for imprint on the target surface of a substrate. In one embodiment, illustrated in FIGS. 11-16, the feeder device 410 comprises a disc grabbing member 411 operable to engage and grasp a disc present in first spacing 203, move it to second spacing 303, and to release it at the second spacing 303. Preferably, as exemplified in the drawings, feeder device 410 comprises one or more arms 412, which are rotatable and possibly telescopically extendable to maneuver between the first 203 and second 303 spacing. In the drawings, feeder device 410 is drawn to be rotated about an axis which is perpendicular to the vertical imprint direction, whereas an alternative embodiment may include movement about an axis which is parallel to the imprint direction. The drawings are consequently intended to indicate the general idea of the feeder device according to this embodiment, in that it operates between the first 203 and second 303 spacing. Feeder device 410 is preferably connected to one of the support frames 219 or 319, or to common carrier 401 as indicated in the drawings. In the shown embodiment, feeder device 410 is rotatably mounted at 413 to common carrier 401, whereby there is a fix relation between the feeder device and the first 203 and second 303 spacing.

After imprint in the first imprint unit, an imprinted disc 5 is generally more or less tightly attached to the template 1, as in FIG. 1*b*. For a disc 5 in the form of a polymer foil as referred to in the examples given in this text, the imprinted disc is held by vacuum force to template 1, but there is preferably no additional adhesion. This anti-adhesion effect is obtained by careful selection of material for template and disc, or by anti-adhesion promoters applied to either the template surface 2, the disc surface 4, or both. In order to separate the imprinted disc from the template in the first imprint unit 200, feeder device 410 also comprises a separation unit in one embodiment. The separation unit includes the disc grabbing member 411 and a disc pulling member operable to separate the disc from the template. Different more detailed embodiments of the separation unit will be described below with reference to FIGS. 17-19.

A preferred mode of operation of the imprint apparatus involves successively using one and the same template 1 numerous times for producing intermediate stamps 10, i.e. stamp 5 or 8, in the first imprint unit 200, wherein each intermediate stamp 10 is used only once in the second imprint unit 300 for imprint on each one substrate 12. Occasionally, though, it will be of interest to change template 1. For this purpose, a template charger mechanism is operable to maneuver between a set of selectable templates, e.g. arranged in a stack 421 such as in a template FOUP (Front Opening Universal Pod), and first spacing 203. The template charger mechanism preferably comprises a template grabber 422, devised to engage and grab either a template or a template carrier in which one template is suspended, and a lever arrangement 423. The template charger mechanism is left out in FIGS. 12-16, where it is not used, for the sake of simplicity.

A disc charger mechanism is operable to maneuver between a set of discs, preferably arranged in a stack 431 such as in a disc FOUP, and first spacing 203. The disc charger mechanism comprises a disc grabber 432, devised to engage and grab a disc from the stack 431, and a lever arrangement 433. The disc grabber 432 may comprise a vacuum suction member devised to engage an upper surface of a fresh disc in the stack 431.

A substrate charger mechanism is operable to maneuver between a set of substrates to be imprinted, preferably arranged in a stack 441 such as in a substrate FOUP, and second spacing 303. The substrate charger mechanism comprises a substrate grabber 442, devised to engage and grab a substrate from the stack 441, and a lever arrangement 443. Also the substrate grabber 442 may comprise a vacuum suction member devised to engage an upper surface of a fresh disc in the stack 431. Alternatively, a tray member may be employed in the substrate grabber 442, for collecting the substrates in the stack be engagement only from underneath the substrates.

A substrate extractor mechanism is operable to maneuver between the second spacing 303 and a port 451 for imprinted substrates. Port 451 may be a second substrate FOUP. In another embodiment, port 451 is a demolding device, operable to release the imprinted substrate from the intermediate stamp. The demolding device may be a mechanical separator devised to pull and peel the intermediate stamp from the imprinted substrate. In an alternative embodiment, the demolding device may comprise a bath with a liquid solution capable of dissolving the intermediate stamp while not affecting the substrate. The substrate extractor mechanism comprises a grabber 452, devised to engage and grab either the imprinted substrate, or more preferably, the upper intermediate stamp, or both, in the second spacing 303, and to remove both the used intermediate stamp and the imprinted substrate to port 451 using a lever arrangement 453. Alternatively, grabber 452 comprises a demolding device operable to release the intermediate stamp from the substrate in the second spacing 303, and to remove the demolded stamp and intermediate stamp. Grabber 452 may comprise a vacuum suction member devised to engage an upper surface, i.e. the non-patterned surface, of the intermediate stamp. Alternatively, a tray member may be employed for collecting the sandwiched substrate and intermediate stamp from underneath the substrate.

Figure 17:
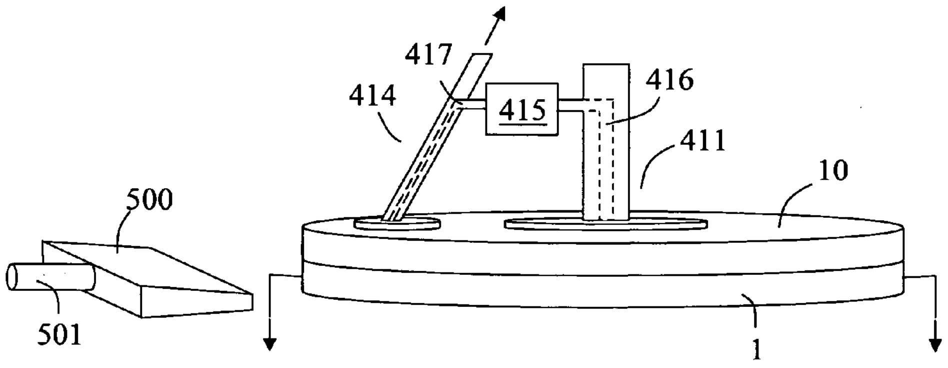

FIG. 17 illustrates a sandwich structure of a template 1 and an intermediate disc 10, preferably a polymer foil, which has been imprinted by the template in the first imprint unit 200. A separation unit for feeder device 410 includes a disc grabbing member 411 and a disc pulling member 414. In this embodiment, a vacuum supply source 415 is connected to selectively supply vacuum through a conduit 416 to disc grabbing member 411 and through a conduit 417 to disc pulling member 414. When vacuum is supplied a grabbing force is obtained by suction, and when the vacuum is release to ambient pressure or above ambient pressure, the grabbing force is released. In order to be able to lift and move a disc 10 in a controlled manner, disc grabbing member 411 is preferably positioned at or near a centre position of disc 10. Disc pulling member 414, however, is placed at a periphery portion of disc 10 as illustrated. This may be mechanically or optically controlled. When vacuum has been supplied to disc pulling member 414, a lifting force is applied, illustrated by an arrow in the drawing. The lifting force may be perpendicular to the engaged disc surface, but preferably the lifting force is directed slightly inwards from the periphery portion of the disc, to ease release. Once the disc has been slightly released at an edge adjacent to the engaged periphery portion, full release follows more or less easily since the vacuum force holding the template 1 and disc 10 together is broken. Downwards directed arrows are also included in the drawing, to indicate that the template holding device operates to hold down the template when disc pulling member 414 operates to separate the disc 20 from the template 1.

Figure 18:
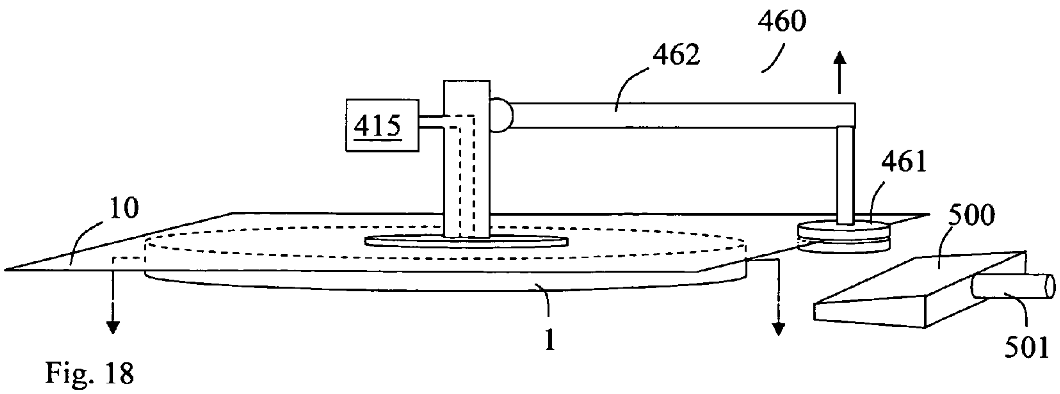

FIG. 18 illustrates schematically another embodiment for the separation unit for feeder device 410, including a disc grabbing member 411 and a disc pulling member 460, also when operating on a disc 10 sandwiched together with a template 1. The disc grabbing member 411 is similar to that of FIG. 17 and will therefore not be described again. In this embodiment, though, disc pulling member 460 comprises a mechanical pinching member 461, operable to grab about an edge of the disc 10. This requires that disc 10 extends over a corresponding edge of template 1. In the illustrated case the disc 10 is a flexible polymer foil having a rectangular shape, which is larger than template 1. Pinching member 461 is operable to grab about the disc edge and subsequently a lifting force is applied as indicated by the upwards directed arrow. One way of achieving this is to rotate the pinching member 461 upwards by means of a lever arrangement 462 connected to disc grabbing member 411, as illustrated.

In a preferred embodiment, disc 10 is a polymer foil. In such an embodiment static electricity generated on surfaces of the foil is a separate problem. For this purpose, a nozzle 500 is provided for subjecting the polymer foil to a stream or curtain of de-ionizing gas, such as ionized air. Nozzle 500 is connected via a conduit 501 to a de-ionizing gas source (not shown). Nozzle 500 may be carried with the disc grabbing member 411 on feeder device 410, or be separately suspended in relation to support frame 219. In one embodiment, nozzle 500, or another nozzle for providing de-ionizing gas, is operable to pass de-ionizing gas over the polymer foil also before placing it in first spacing 203 and before placing it in second first spacing 303.

Figure 19:
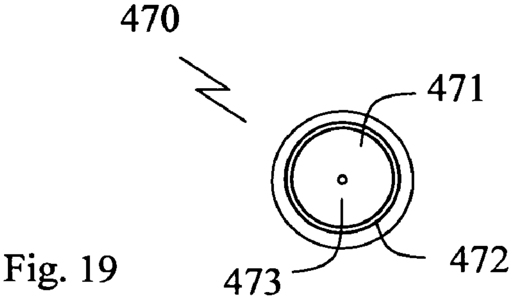
FIGS. 17-19 schematically illustrate different solutions for grabbing and separating two elements sandwiched together by an imprint process.

FIG. 19 illustrates an embodiment of a device 470 usable for grabbing hold of a surface. A substantially flat support surface 471 carries a peripheral seal 472, such as an o-ring placed in a retaining recess. Inside seal 472, an orifice 473 of a conduit is formed, which conduit is selectively connected to vacuum. A device 470 may be used for disc grabbing member 411 and disc pulling member 414, or any other device of the imprint apparatus operable for grabbing and lifting templates, discs, and substrates.

Figure 11:
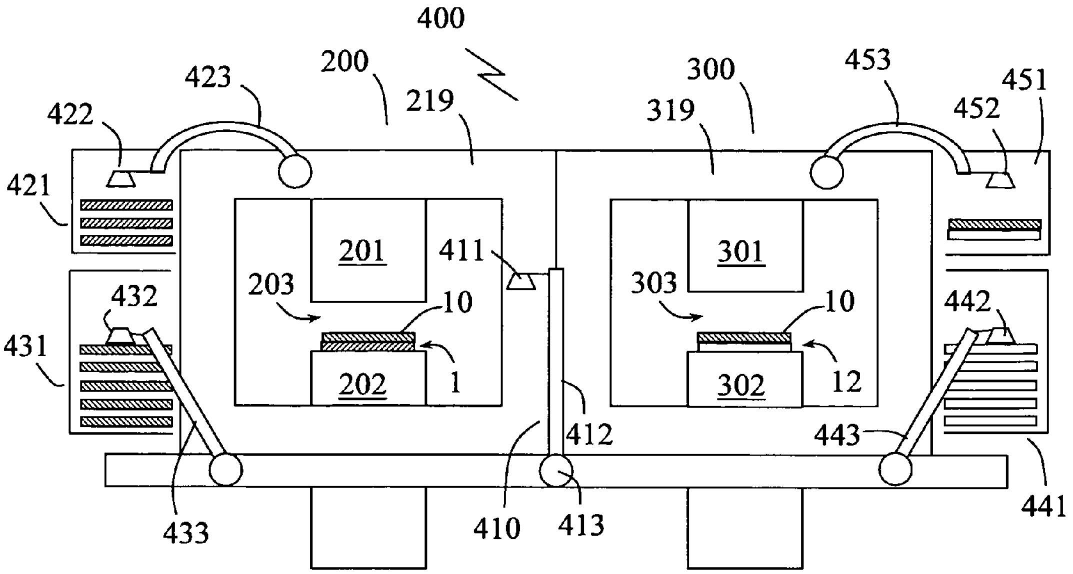
FIG. 11 schematically illustrates an embodiment of an imprint apparatus according to the invention, comprising two imprint units and a feeder device for moving a disc between the two units.

FIGS. 12-16 includes simplified illustrations of the apparatus of FIG. 11, and illustrate different process steps for one mode of operation of the imprint apparatus. It should be noted that many variants for operating the imprint apparatus exist, and the actual synchronization between the two imprint units is dependent on e.g. difference in imprint process time in the two units 200 and 300.

Figure 12:
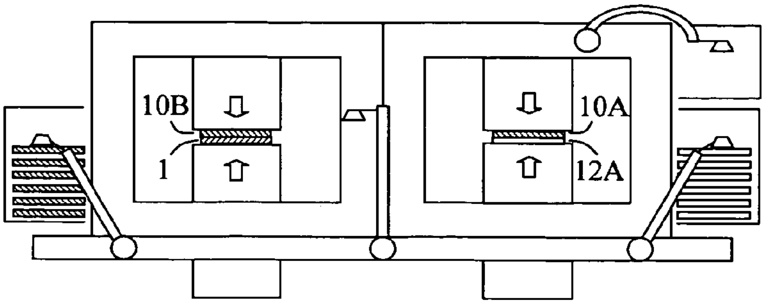
FIGS. 12-16 schematically illustrate different process steps using the apparatus of FIG. 11 in a two-step imprint process.

In FIG. 12 first imprint unit 200 currently imprints a surface pattern of a template 1 into an opposing receiving surface of an intermediate disc 10B. Also, second imprint unit 300 currently imprints a surface pattern of a receiving surface of an intermediate disc 10A into an opposing target surface of a substrate 12A. Disc charger mechanism and substrate charger mechanism are both standby to collect and load fresh objects, and feeder device 410 is in a waiting position.

Figure 13:
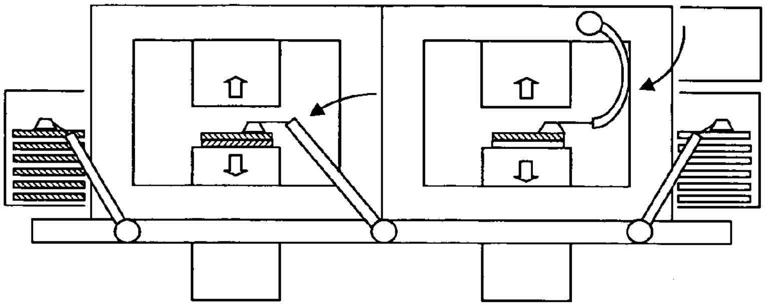

In FIG. 13 both imprint units have released their imprint pressure, and the respective cooperating members have been separated to open up intermediate spacing 203 and 303. When the cooperating main parts of unit 200 are separated feeder device 410 is triggered to enter first spacing 203 and grab the now imprinted intermediate disc 10B. Substrate extractor mechanism is also triggered by the separation of the cooperating main parts of unit 300 to enter second spacing 303 and grab the sandwiched intermediate disc 10A and the now imprinted substrate 12A.

Figure 14:
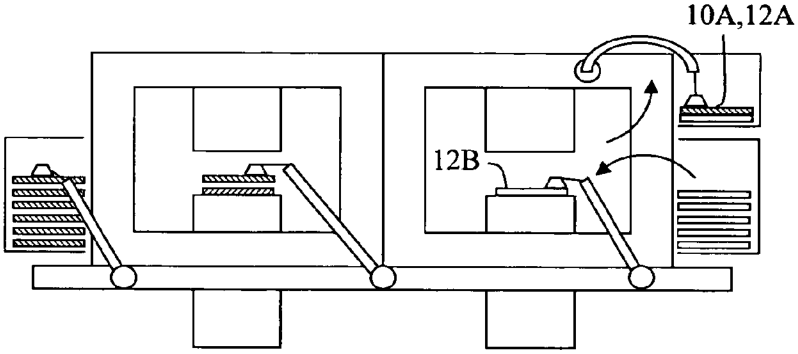

In FIG. 14 extractor mechanism has moved the sandwiched disc 10A and substrate 12A to port 451, and subsequently substrate charger mechanism has grabbed and moved a fresh substrate 12B from stack 441 to intermediate spacing 303. Preferably, substrate charger mechanism properly positions and then releases the fresh substrate 12B at a support surface of the lower main part of the second imprint unit 300. In the first imprint unit, the imprinted disc 10B has been separated from template 1 and lifted by feeder device 410.

Figure 15:
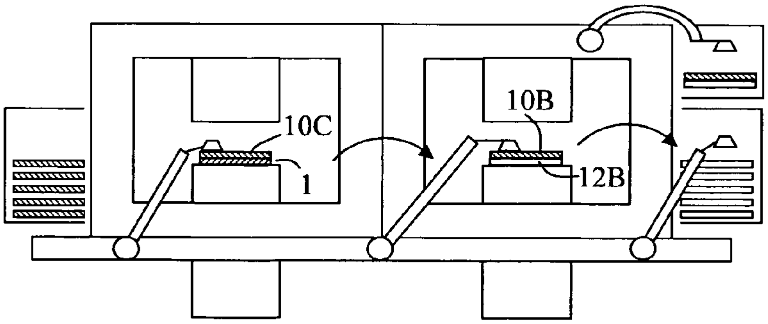

In FIG. 15, feeder device 410 has moved the imprinted disc 10B from the first spacing 203 to the second spacing 303, where it is placed with the imprinted receiving surface downwards against a target surface of fresh substrate 12B. When disc 10B has been removed from first spacing 203, disc charger mechanism operates to place a fresh disc 10C on template 1 in the first spacing, where fresh disc 10 corresponds to foil 3 of FIG. 1*a*. Substrate charger mechanism has assumed a standby position at substrate stack 441.

Figure 16:
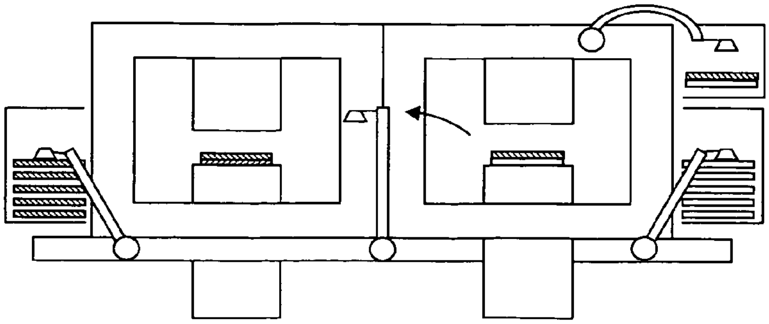
Figure 20:
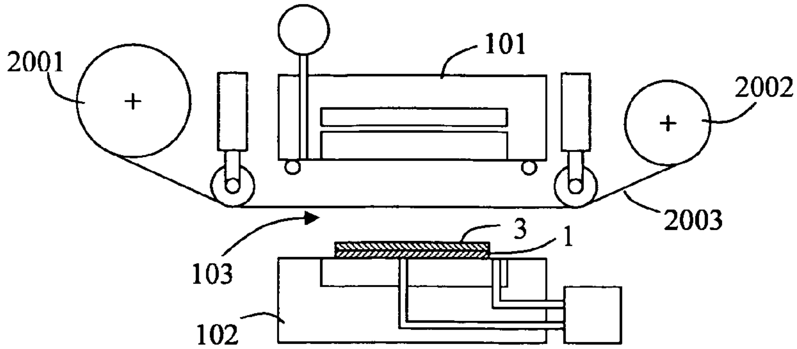
FIGS. 20-23 schematically illustrate different process steps of an embodiment of an imprint unit with a successively forwarded membrane.

In FIG. 16, also the disc charger mechanism has assumed a standby position at disc stack 431, and the feeder device 410 has assumed its standby position. The process is now ready to continue as illustrated in FIG. 12.

FIGS. 20-23 illustrate a membrane feeding system in accordance with an embodiment of the invention. The membrane feeding system is configured to successively and stepwise feed forward a fresh membrane to the intermediate spacing between two main parts of an imprint unit. With reference to the double imprint unit apparatus as described with reference to FIGS. 11-16, such a type of membrane feeding system may be employed in any of the two imprint units 200 and 300. It is, however, particularly useful in the first imprint unit. The membrane feeding system is therefore not restricted to use in a double unit imprint apparatus. Where they correspond, like elements in FIGS. 20-23 carry the same reference numerals as in FIG. 8, and where no reference numerals are included but referred to, these correspond to the elements of FIG. 8. Some elements needed to carry out the imprint process are left out in FIGS. 20-23, though, for the sake of simplicity. In the illustrated embodiment, the membrane feeding system comprises pair of rollers 2001 and 2002, and a membrane ribbon 2003 configured to be rolled off from a first roller 2001 to a position in the first intermediate spacing 103 and subsequently onto the second roller 2002. When a portion of the membrane ribbon has been used in an imprint process in spacing 103, a feeder device (not shown) such as an electric motor driving second roller 2002 to rotation, feeds the used membrane portion out of spacing 103 and a fresh portion of membrane ribbon 2003 into position in spacing 103. This is also the scene shown in FIG. 20.

In spacing 103, a template 1 is placed on a lower support surface 105. A disc 3, preferably a flexible polymer foil, to be imprinted is placed on top of template 1 with a receiving surface 4 facing a structured surface of template 1, as in FIG. 1*a* but upside down.

Figure 21:
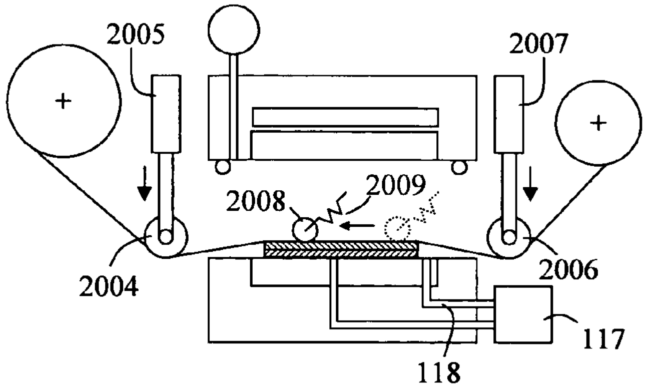

FIG. 21 illustrates how a membrane displacement member is operated to displace the membrane portion present in the intermediate spacing in a direction parallel to an adjustment direction of a press device of the imprint unit, i.e. vertically in the example of the drawing, towards the upper member of the sandwich pair 1 and 3, in this case disc 3. In the example of the drawing, the membrane displacement member comprises a pair of guide rollers 2004 and 2006, each being suspended by a cylinder 2005 and 2007, respectively, operated to press the membrane portion present in spacing 103 downwards until the membrane engages the adjacent surface of disc 3.

In a subsequent step, when the main parts 101 and 102 are brought together and seal 108 engages and presses membrane 2003 towards support surface 105, vacuum will be supplied from vacuum source 117 through conduit 118 for evacuation of air. However, when membrane 2003 has been placed over disc 3, there may be inclusions of air there between, which may be captured as the pressure around the periphery of disc 3 increases. Since, in a preferred embodiment, disc 3 is a flexible polymer foil which is imprinted by heating it up and above its glass transition temperature, any particle or bubble present between the foil 3 and membrane 2003 will also be transferred to the backside of foil 3. Small distortions will be of no relevance, since the backside of foil 3 is not used. However, bubbles of air or other gas may penetrate through the polymer foil and damage the pattern transferred to the receiving surface of the foil 3 from template 1. In order to minimize this risk, a press roller 2008 is controlled to roll over the side of membrane 2003 facing away from the sandwich arrangement, as is illustrated in FIG. 21. Press roller 2008 preferably has a soft envelope surface of rubber or silicone, and is preferably suspended by a biased spring 2009 to apply a certain down force. An alternative to the roller solution of FIG. 21 could be to move an edge of rake over the membrane.

Figure 22:
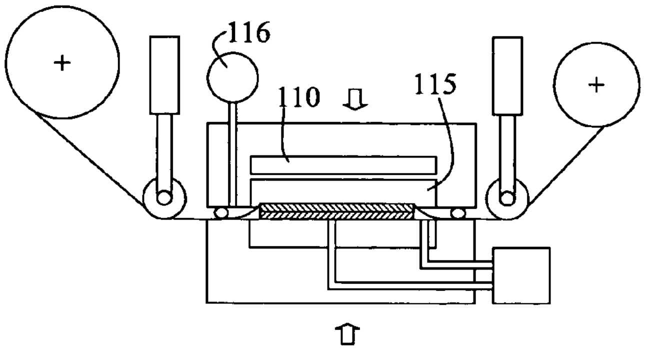

FIG. 22 illustrates the imprint sequence, where the main parts 101 and 102 have been brought together, and where pressure is provided from a source 116 to a gas or liquid present in a cavity 115, which pressure is transferred by the membrane to the sandwich arrangement to perform the imprint. As previously pointed out, imprint may also be assisted by radiation, in which case a radiation source 110 is included to emit radiation through membrane 115 and disc 3 to a radiation sensitive imprint layer of disc 3 engaged by template 1.

Figure 23:
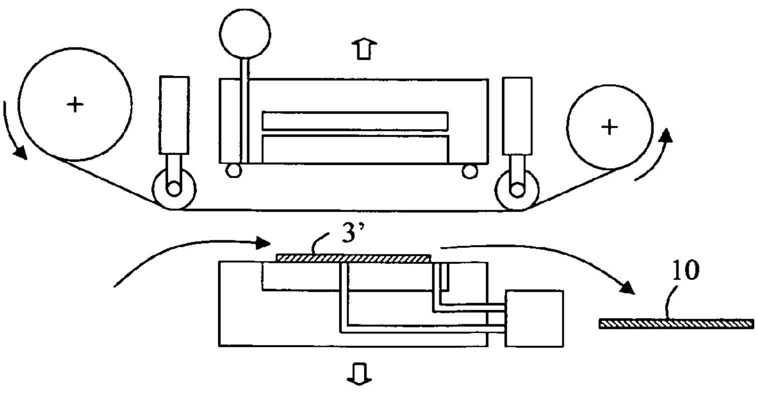

After the imprint process, possibly including postbaking, the main parts 101 and 102 are separated and membrane 2003 is lifted, as is illustrated in FIG. 23. The imprinted disc 3, now stamp 10, is removed, possibly directly to a second imprint unit as described with reference to FIGS. 11-16, and a fresh disc 3' to be imprinted is placed on template 1 in spacing 103. The membrane feeding system feeds the used membrane portion out of spacing 103 and a fresh portion of membrane ribbon 2003 into position in spacing 103 to be used when imprinting disc 3'. Again, this is particularly useful when the disc to be imprinted is a flexible polymer foil. During imprint, the imprint temperature exceeds the glass transition temperature for the polymer foil, but not the glass transition temperature for the membrane material. However, suitable membrane materials, such as polycarbonate, polypropylene, polyethylene, PDMS and PEEK, selected dependent on the material of the polymer foil to be imprinted, may suffer mechanical deformation in the imprint process. Such deformation is typically caused in the periphery portions, by the edges of the template and possibly the polymer foil, but may also be caused inside the periphery. In subsequent imprint processes, any deformations in the membrane may be transferred to the polymer foil to be imprinted, and even if the backside thereof is not to be used, the deformations may as mentioned penetrate to the receiving surface of the foil. By consistently feeding forward a new membrane portion to be used, this problem is minimized.

FIGS. 24-27 illustrate another embodiment of an imprint apparatus according to the invention. In this embodiment, the feeder device operable to move an imprinted disc from the first spacing to the second spacing of two cooperating imprint units has a different configuration, and comprises a polymer foil ribbon and a ribbon feeding mechanism. Apart from the feeder device the first and second imprint units may substantially be configured as described with reference to FIGS. 8 and 11. Elements presented before with reference to those drawings will therefore be referred to using the same reference numerals, shown in FIGS. 24-27 or not. The embodiment of FIGS. 24-27 is particularly useful for producing patterned substrates where the patterned surface layer of the imprinted substrates is to remain on the substrate, and potentially subsequently be metallized, e.g. for producing memory discs.

Figure 24:
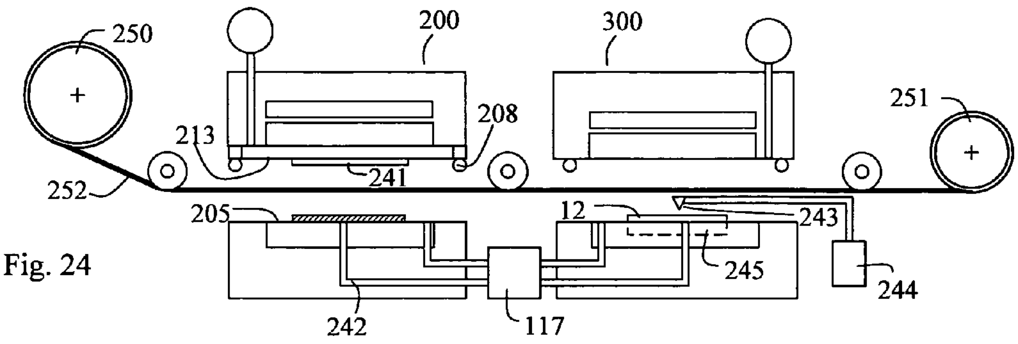
FIGS. 24-27 schematically illustrate different process steps using another embodiment of an imprint apparatus according to the invention in a two-step imprint process.

FIG. 24 illustrates the first 200 and second 300 imprint units with their respective pairs of cooperating main parts separated to open up intermediate spacing 203 and 303, respectively. First imprint unit 200 may have a membrane feeding system as described with reference to FIGS. 20-23. In the shown embodiment, though, first imprint unit 200 has a fixed membrane 213. Preferably, membrane 213 has a substantially rigid central portion 241, selected to correspond to a template dimension for which the first imprint unit 200 is configured. The rigid central portion 241 may be connected at its periphery to membrane 213. Alternatively, membrane 213 covers the entire template, whereas the rigid central portion 241 is a plate adhered to the membrane 213 on its upper or lower side. In this embodiment, seal 208 is located under membrane 213. A template 1 is placed on support surface 205 of the lower support member, where it preferably is retained mechanically and by means of vacuum suction through a conduit 242 connected to vacuum supply source 117. The second imprint unit is devised basically as described with reference to FIG. 8, and has a fresh substrate 12 to be imprinted placed on the lower main part 302. Vacuum supply source 117, or another source, is preferably also connected to the support surface of the lower main part via a conduit 342, corresponding to the arrangement described for first imprint unit 200. One difference is that here the polymer foil ribbon acting as intermediate stamp also acts as the membrane. In one embodiment, second imprint unit 300 also includes a material dispenser 243, operable to apply a thermally or UV-curable pre-polymer from a pre-polymer source 244, onto a substrate 12 present in second spacing 303. Dispensing may be obtained by rolling on the pre-polymer, but in a preferred embodiment a support surface of the lower main part 302 comprises a spinner 245, such that central dispensation from dispenser 243 and rotation by spinner 245 provides spin-coating of the pre-polymer on the upper target surface of the substrate 12. In an alternative embodiment, a spin-coating station is provided adjacent to second imprint unit 300, from which a substrate charger picks up coated substrates and successively launches them into the second spacing.

In this embodiment, the feeder device for moving an imprinted disc from the first to the second imprint unit is combined with the function of the disc charger. In the illustrated embodiment, the feeder device comprises a pair of rollers, where a first roller 250 with a fresh blank polymer foil ribbon 252 is provided before the first imprint unit, from which first roller the ribbon is guided through first spacing 203, second spacing 303, and to a second roller 251. As an alternative to rolling up the imprinted polymer foil ribbon 252 after the second imprint unit 300, it may be successively cut up and separated such that each used intermediate stamp portion follows along with the substrate it has imprinted in the second imprint unit for subsequent separation or dissolving of the intermediate stamp.

In FIG. 24, the polymer foil ribbon 252 present over substrate 12 has been imprinted by template 1 in first imprint unit 200 in a prior step, and then the ribbon 252 has been fed forward by means of e.g. an electric motor (not shown) pulling the ribbon from the side at which roller 251 is positioned. Over template 1, a fresh portion of polymer foil is present.

Figure 25:
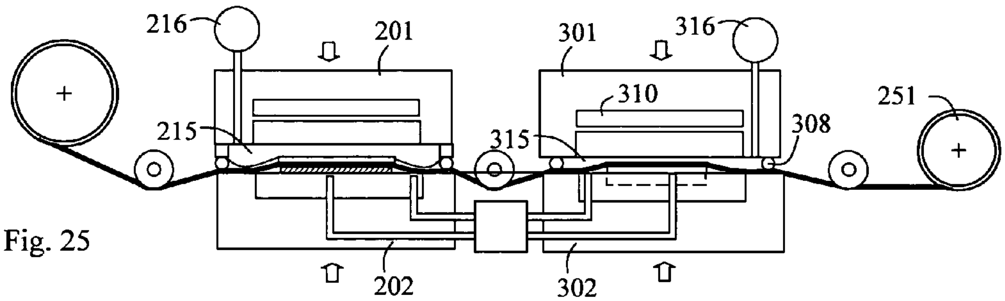

In FIG. 25, corresponding main parts 201 and 202, and 301 and 302, have been brought together. In the first imprint unit 200, the fresh polymer foil portion is imprinted by the structured template surface, by pressure provided from a pressure source 216 to a gas or fluid present in a cavity 215 behind membrane 213 with rigid portion 241, which membrane presses foil 252 towards template 1. The imprint process may be thermal or radiation-assisted, as previously described. In the second imprint unit 300, the previously imprinted polymer foil portion now acts as intermediate stamp and as membrane, and is engaged by a seal 308 of the upper main part 301. The intermediate stamp imprints the target surface of substrate 12 by pressure provided from a pressure source 316 to a gas or fluid present in a cavity 315 behind the intermediate stamp portion of ribbon 252. Preferably, this process is carried out at a relatively low pressure ranging from 1 to 20 bar, and UV-radiation of a suitable dose from a source 310. exposes and cures the pre-polymer through the polymer foil 252 thereby curing the pre-polymer and bonding it to the substrate 12.

Figure 26:
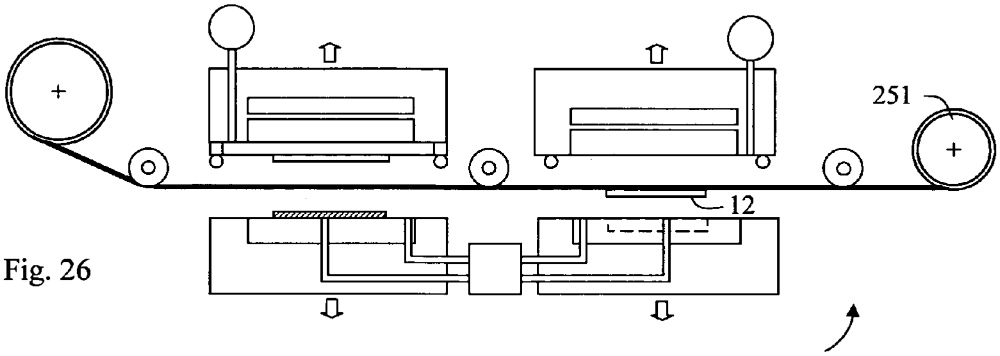

In FIG. 26, the cooperating main parts of the two imprint units have again been separated, after the imprint sequence and possibly postbaking has taken place. Some form of separation device (not shown) should be employed in this step, such as one of the solutions described with reference to FIG. 17 or 18. This is particularly relevant for the first imprint unit 200, where the template is to maintain at the lower support surface. Also in the second imprint unit a built-in separation device may be included. In the illustrated embodiment, though, the imprinted substrate 12 is allowed to maintain in contact with the used intermediate stamp.

Figure 27:
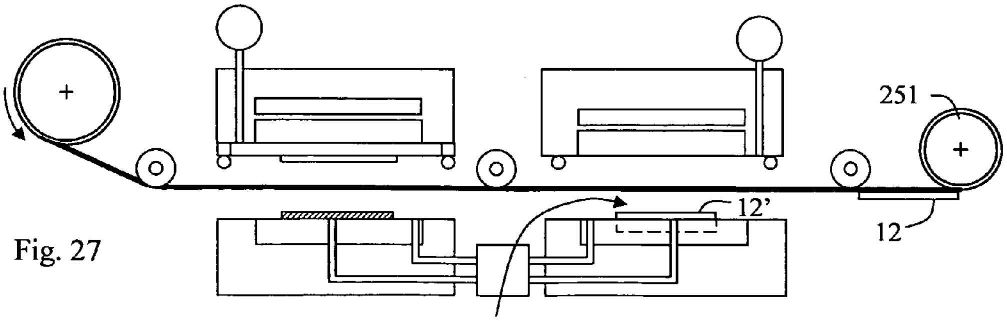

In FIG. 27, finally, the feeder device is operated to feed the polymer foil ribbon 252 one step, such that the portion last imprinted by template 1 is now positioned in second spacing 303. The last imprinted substrate 12 is thereby pulled out of spacing 303, and may be separated from foil 252 in the same process. Preferably, though, separation from the foil is performed separately after removal from spacing 303. A fresh substrate 12' is then placed on the lower support surface of the second imprint unit 300 by means of a substrate charger.

The embodiment described with reference to FIGS. 24-27 may also include displacement members for pressing guide rollers 252 downwards and press rollers for pressing out air, in accordance with what has been described with reference to FIGS. 20-23.

Figure 28:
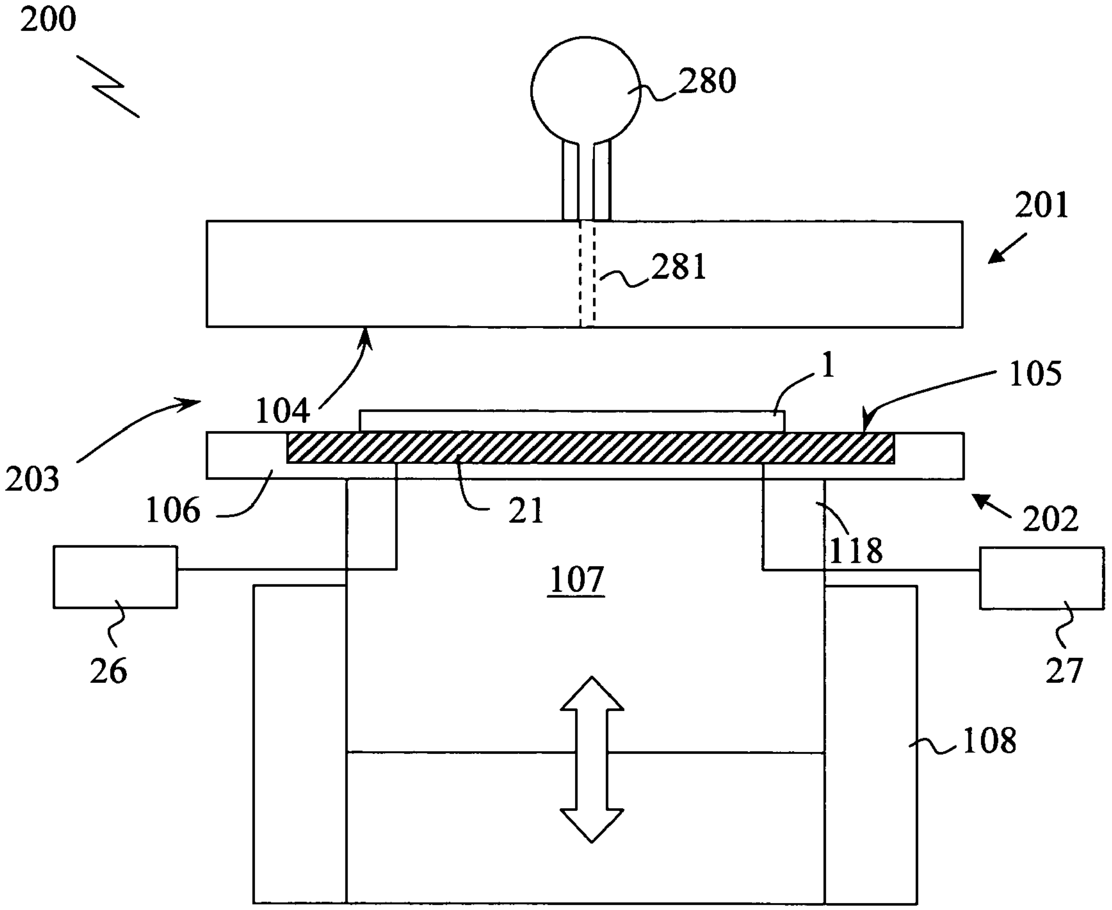
FIG. 28 schematically illustrates an embodiment of a first imprint unit in the form of an injection molding unit, for creating a polymer stamp for use in a second imprint unit

An alternative embodiment of the invention is illustrated in FIG. 28. In this embodiment, the first imprint unit 200, which is then one shown in the drawing, is an injection molding unit. The molding unit of FIG. 28 is to a large extent similar to the embodiment of FIG. 8, and the same reference numerals are therefore used for certain elements. A difference, though, is that there is no membrane and no gas or liquid present to apply pressure. A template 1 is illustrated as placed on the lower support surface 105, which template is made to hold a suitable process temperature of e.g. 50-90° C. The lower main part 202 is movable by means of spacing adjustment device 107, 108, to adjust spacing 203 between upper main part 201 and lower main part 202. Preferably, the main parts are adjusted such that the upper main part is located with a down-facing surface 104 close to the template surface, about 0.1-1 mm. At that point, molten polymer is applied from a polymer source 280, through a conduit 281 is the upper main part 201. Preferably, the molten polymer is provided using a pressing force, e.g. by applying a force from source 280 or by mechanically screwing it into spacing 203. Once the molten polymer is applied, pressure may be provided using spacing adjustment device 107, 108 to securely introduce molten polymer material into the pattern of the template. Alternatively, the main parts 201, 202 are kept at the predetermined distance from each other, and the application pressure for the molten polymer material provides the only pressure. The molten polymer material typically holds 200-250° C., and is therefore rapidly cooled down by the comparatively cold template 1. Furthermore, since the spacing 203 defining the resulting thickness of the created polymer stamp is so small, typically less than 1 mm, cooling is fast, normally not more than 10 seconds. Afterwards, the spacing adjustment device 107, 108 acts to open up spacing 203, after which the so created polymer stamp may be demolded and moved from the first spacing 203 to the spacing of a second step imprint unit, by means of a feeder device. The feeder device and the second imprint unit may take any form as described with reference to FIGS. 5-23.

EXAMPLES

Some polymer foils which may be used are:

Topas 8007 from Ticona GmBH, Germany: thermoplastic random co-polymer having a glass temperature of 80° C. Topas is transparent to light with wavelengths above 300 nm and is characterized by a low surface energy. The foil is available in thicknesses of 50-500 μm. 130-140 μm thick foils have been used here. This material may also be employed for injection molding in the first imprint step.

Zeonor ZF14 from Zeon Chemicals, Japan: thermoplastic polymer having a glass temperature of 136° C. and a light transmittance of 92% for wavelengths above 300 nm. A used foil has a thickness of 188 μm but is available in other thicknesses ranging from 50 to 500 μm. This material may also be employed for injection molding in the first imprint step.

Zeonex E48R from Zeon Chemicals, Japan: thermoplastic polymer having a glass temperature of 139° C. and a light transmittance of 92% for wavelength above 350 nm. A used foil has a thickness of 75 μm. This material may also be employed for injection molding in the first imprint step.

Polycarbonate (Bisphenol-A polycarbonate) from Bayer AG, Germany: thermoplastic polymer having a glass temperature of 150° C. and a light transmittance of 91% for wavelength above 350 nm. A used foil has a thickness of 300 μm and is available in many other thicknesses up to 1 mm. This material may also be employed for injection molding in the first imprint step.

A resist material which has been used is SU8 from MicroChem Corp. USA, a photo-resist material, curable after exposure to light having wavelengths between 350 and 400 nm. As an adhesion promoter between the SU8 film and the silicon substrate a thin LOR0.7 film from MicroChem Corp. USA has been used.

The following describes examples of a two-step imprint process for which an imprint apparatus according to the invention may be employed.

Example 1

Figure 2:
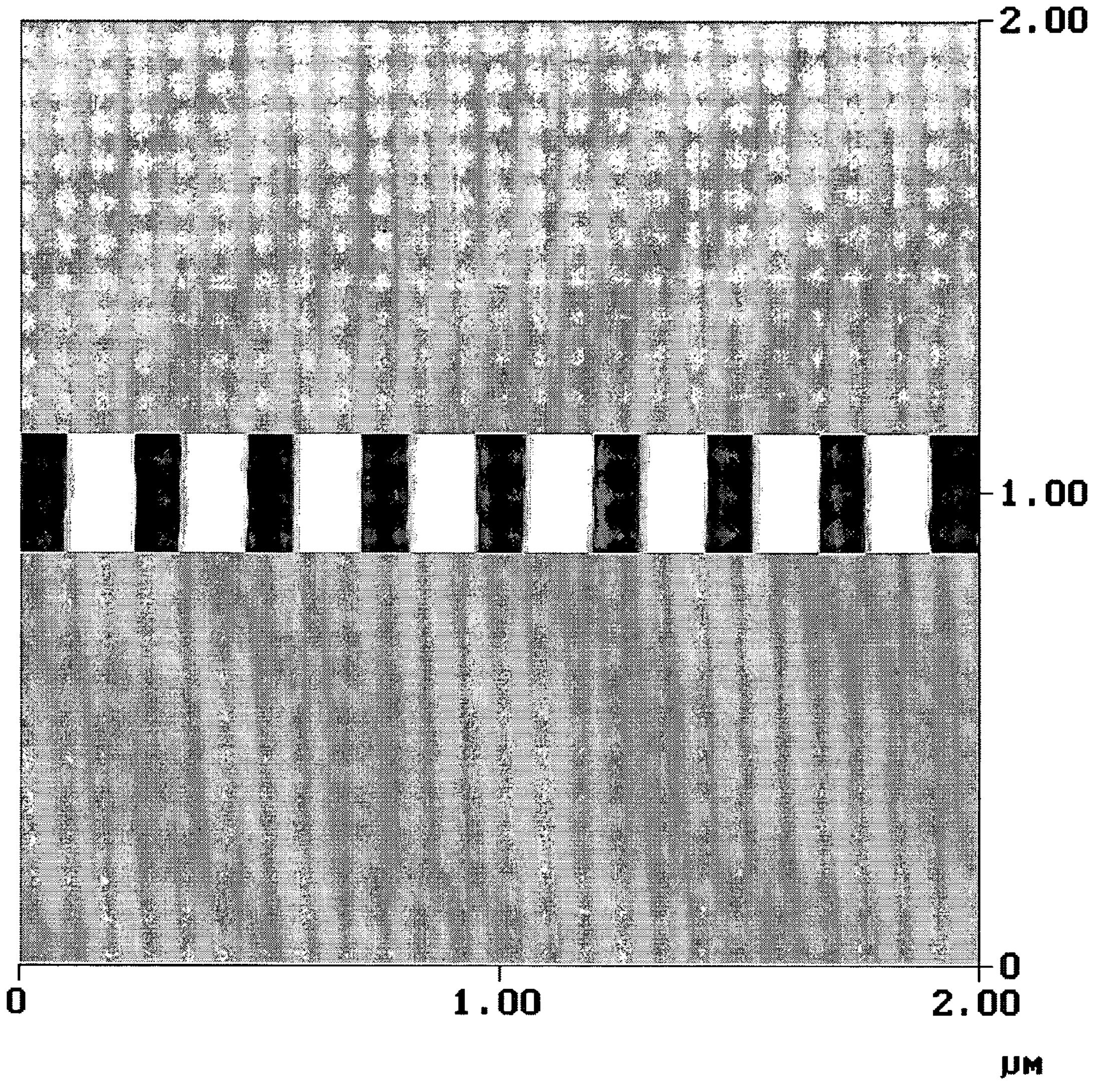
FIG. 2 shows an AFM tapping mode image of a line pattern, imprinted in SU8 by means of a methods according to an embodiment of the invention.

A nickel template whose surface exhibits a line pattern, having a line width of 80 nm and a height of 90 nm has been imprinted into a Zeonor ZF14 foil at 150° C. and 50 bar for 3 min. None of the surfaces have been treated by any additional coating such as, e.g. anti-adhesion layers. The release temperature was 135° C., at which the Zeonor foil could mechanically be removed from the nickel surface without damaging the pattern of neither the template nor the replica. The Zeonor foil has been used as a new template, which has been imprinted into a 100 nm thick SU8 film. The SU8 film was spin-coated onto a 20 nm LOR film, previously spin-coated onto a silicon substrate. Also here, none of the surfaces has been treated by an additional coating, having the purpose to improve the anti-adhesion behavior between the SU8 film and the Zeonor foil. The imprint was performed at 70° C. and 50 bar for 3 min. The SU8 film was exposed to UV-light for 4 seconds through the optically transparent Zeonor foil and baked for two more minutes. Both temperature and pressure were kept constant at 70° C. and 50 bar, respectively, during the entire imprint sequence. The release temperature was 70° C. at which the Zeonor foil could mechanically be removed from the SU8 film without damaging the pattern of neither the polymer template foil nor the replica film. The AFM image of an imprint result in the SU8 film deposited on a silicon wafer is shown in FIG. 2.

Example 2

Figure 3:
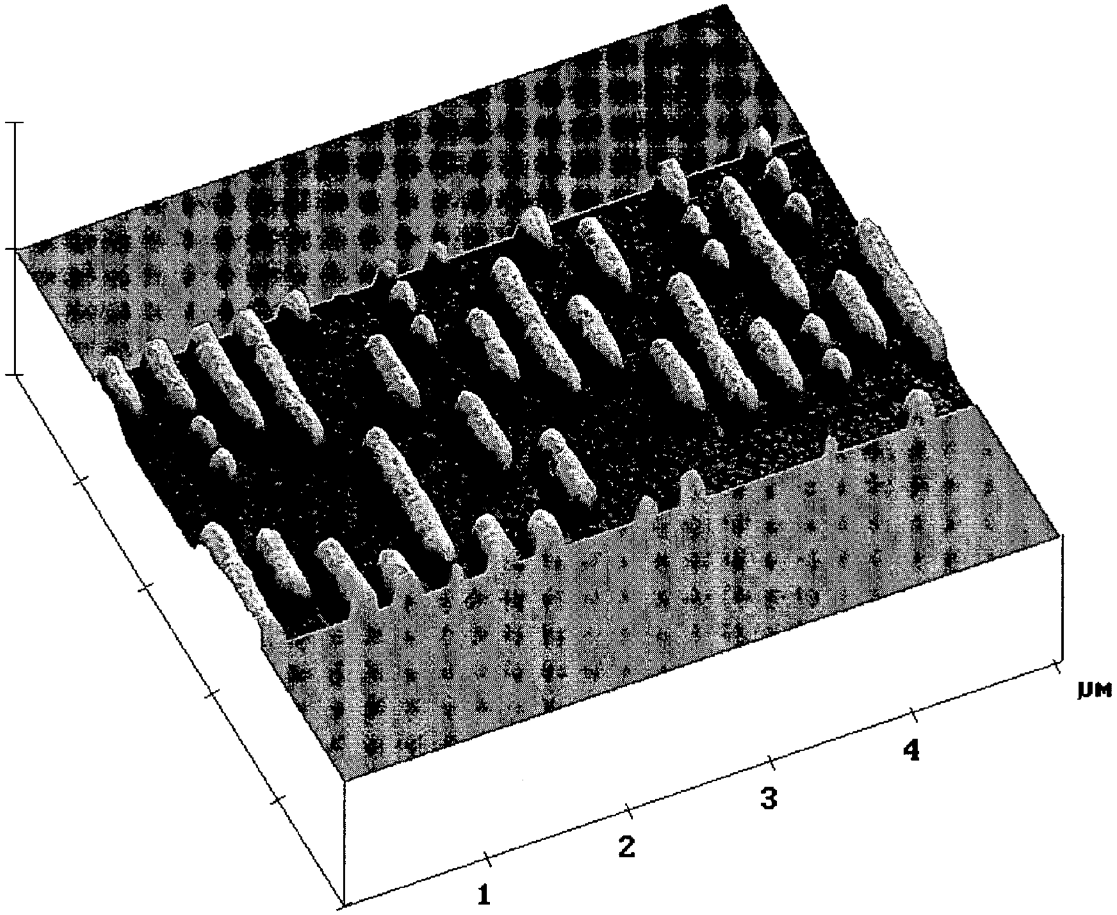
FIG. 3 shows an AFM tapping mode image of a BluRay optical disk pattern, imprinted in SU8 according to an embodiment of the invention.

A nickel template whose surface exhibits a BluRay pattern having structure heights of 100 nm and widths of 150 nm—investigated by AFM—has been imprinted into a Zeonor ZF14 using the same process and the same parameters as already described in Example 1. The Zeonor foil has been used as a new template, which has been imprinted into a 100 nm thick SU8 film. Also here the same process and the same parameters as already described in Example 1 have been used. The AFM image of an imprint result in the SU8 film deposited on a silicon wafer is shown in FIG. 3.

Example 3

Figure 4:
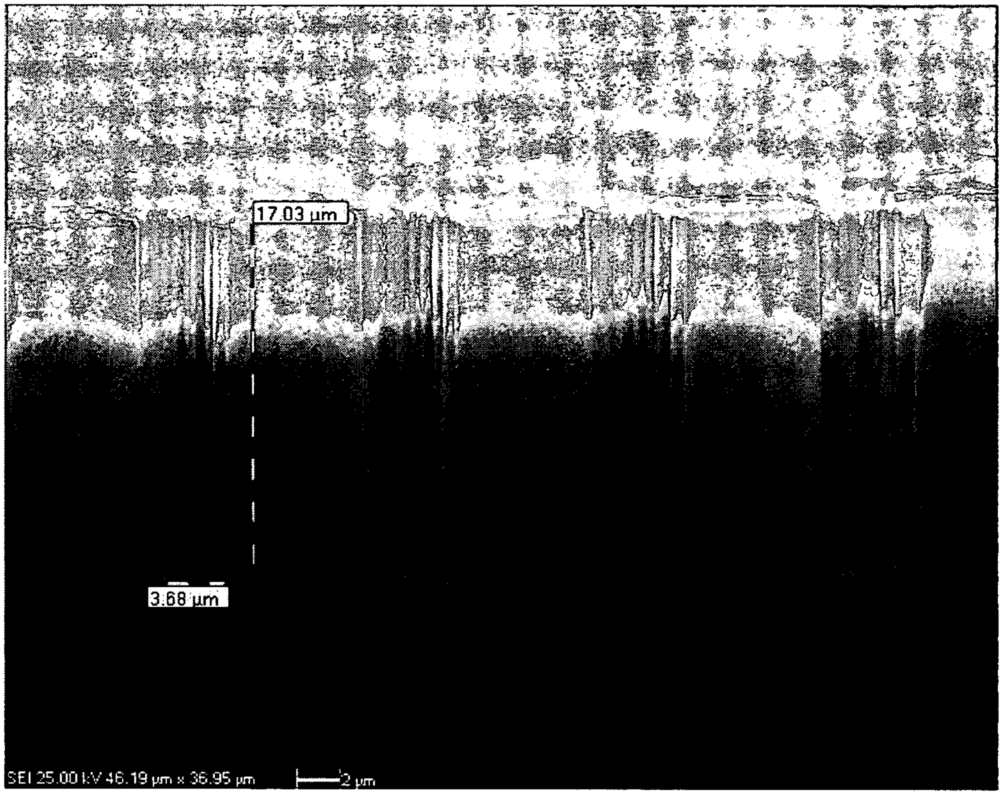
FIG. 4 shows SEM images of a pillar pattern having micrometer dimensions with high aspect-ratios, provided by imprint in accordance with an embodiment of the invention.
Figure 4:
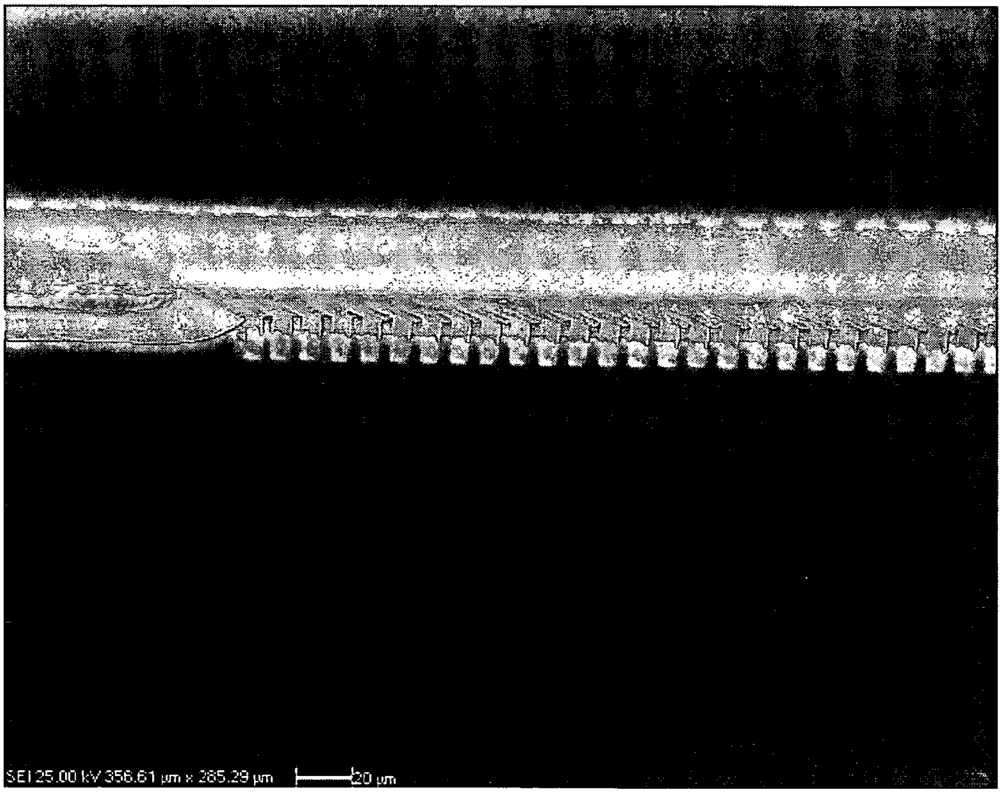

A nickel template has been used whose surface contains micro-meter patterns with high aspect-ratios ranging from 1-28. The feature size ranges from 600 nm to 12 μm, at a height of 17 μm. The surface has been covered by a phosphate-based anti-adhesion film before the imprint. The nickel template has been imprinted into a polycarbonate foil at 190° C. and 50 bar for 3 min. The surface of the polycarbonate foil has not been treated by an additional coating, having the purpose to improve the anti-adhesion behavior between the Ni template and the polycarbonate film. The release temperature was 130° C., at which the polycarbonate foil could mechanically be removed from the nickel surface without damaging the pattern of neither the template nor the replica. The polycarbonate foil has been used as a new template for an imprint into a Topas foil. The imprint has been performed at 120° C. and 50 bar for 3 min. None of the surfaces has been disposed by an additional coating, having the purpose to improve the anti-adhesion behavior between the polycarbonate and the Topas foil. The release temperature was 70° C., at which the Topas could mechanically be removed from the polycarbonate foil without damaging the pattern of neither the template foil nor the replica foil. The Topas foil has then been used as a new template, which has been imprinted into a 6000 nm thick SU8 film spin-coated onto a silicon substrate. Also here, none of the surfaces has been treated by any additional coating, having the purpose to improve the anti-adhesion behavior between the SU8 film and the Topas foil. The imprint was performed at 70° C. and 50 bar for 3 min. The SU8 film was exposed to UV-light for 4 seconds through the optically transparent Topas foil and baked for two more minutes without changing the temperature of 70° C., or the pressure of 50 bar during the entire process. The release temperature was 70° C. Afterwards the Topas foil has completely been dissolved in p-xylene at 60° C. for one hour. An SEM image of the result is shown in FIG. 4. In a preferred embodiment, an apparatus for carrying out this process comprises three imprint units arranged in succession, where the master template is used to provide a first intermediate stamp, in polycarbonate in this example, in the first imprint unit. The first intermediate stamp is then used for imprint on a second foil, Topas in this example, for producing a second intermediate stamp in a second imprint unit. In a third imprint unit, the second intermediate stamp is used for transferring its pattern top the target substrate by imprint. One and the same feeder device may be employed for moving imprinted intermediate stamps between the imprint units, alternatively one feeder device is provided between the first and second imprint units, and a second feeder device is provided between the second and third imprint units.

Experimental

The Imprint processes given in the examples above have been performed with differently patterned Ni stamps, in some cases covered by phosphate-based anti-adhesion films, using different process parameters. The substrates (2 to 6 inch silicon wafers) have been cleaned by rinsing with isopropanol and acetone directly before spinning the LOR and the SU8 films. The sizes of the applied stamps are 2 to 6 inches. The imprints have been carried out using an Obducat-6-inch-NIL equipment, provided with an UV-module.

Atomic force microscopy (AFM) in the tapping mode with the help of a NanoScope IIIa microscope from Digital Instruments was carried out to investigate both the imprint results and the stamps after performed imprint.

Scanning Electron Microscopy (SEM) has been performed using a Obducat CamScan MX2600 Microscope at 25 kV.

What is claimed is:

1. Apparatus for imprint lithography for transferring a pattern of a structured surface of a template to a target surface of a substrate, comprising a first imprint unit including a first pair of cooperating main parts arranged opposite to one another with an intermediate first spacing and a first press device arranged to adjust the first spacing to transfer a pattern of a structured surface of a template to a receiving polymer surface of a disc in a first imprint step, a second imprint unit including a second pair of cooperating main parts arranged opposite to one another with an intermediate second spacing, and a second press device arranged to adjust the second spacing to imprint the transferred pattern of the disc to a target surface of a substrate in a second imprint step, and a feeder device arranged to move the disc with the transferred pattern from the first spacing to the second spacing wherein a first support frame carries the first pair of cooperating main parts and a second support frame carries the second pair of cooperating main parts, and where a fixation member holds the first and the second support frames in a fixed relation to each other.

2. The apparatus of claim 1, wherein one of the first pair of cooperating main parts comprises a cavity for a medium, and a pressure supply system for adjusting a pressure of the medium in the cavity, a wall of the cavity comprising a flexible membrane of which one side forms a support surface facing the other of the first pair of cooperating main parts.

3. The apparatus of claim 1, wherein one of the second pair of cooperating main parts comprises a cavity for a medium, and a pressure supply system for adjusting a pressure of the medium in the cavity, a wall of the cavity comprising a flexible membrane of which one side forms a support surface facing the other of the second pair of cooperating main parts.

4. The apparatus of claim 1, wherein one of the first pair of cooperating main parts comprises a template support surface with a template holding device.

5. The apparatus of claim 4, wherein the template holding device comprises a mechanical template retaining member.

6. The apparatus of claim 4, wherein the template holding device comprises a vacuum supply source, a conduit connected between the vacuum supply source and an orifice in the support surface, and a seal provided around the orifice.

7. The apparatus of claim 1, wherein one of the first pair of cooperating main parts comprises a template support surface with a heater device.

8. The apparatus of claim 7, comprising a temperature control unit connected to the heater device.

9. The apparatus of claim 1, wherein one of the first pair of cooperating main parts comprises a radiation source, arranged to emit radiation towards the first intermediate spacing.

10. The apparatus of claim 4, wherein the feeder device comprises a separation unit, including a disc grabbing member arranged to engage and grasp an imprinted disc present in the first spacing, and a disc pulling member arranged to separate the disc from the template.

11. The apparatus of claim 10, wherein the disc pulling member is configured to engage an imprinted disc at an off-centre position.

12. The apparatus of claim 10, wherein the disc pulling member is configured to provide a pulling force to the disc which is directed away from the template and towards the centre of the disc.

13. The apparatus of claim 10, wherein the disc grabbing member comprises a mechanical grabbing member to grasp about a side edge of the disc.

14. The apparatus of claim 10, comprising a vacuum supply system, a conduit connected between the vacuum supply system and an orifice at the disc grabbing member, and a seal arranged about the orifice.

15. The apparatus of claim 2, wherein the membrane is separate from the main part and is configured to be placed in engagement with a gasket arranged about a portion of the main part to form the cavity.

16. The apparatus of claim 15, comprising a membrane feeding system synchronized with the first press device to successively feed a fresh membrane to the first intermediate spacing for each cycle of the first imprint step.

17. The apparatus of claim 16, wherein the membrane feeding system includes a pair of rollers and a membrane ribbon configured to be rolled off from a first roller to a position in the first intermediate spacing and subsequently onto a second roller.

18. The apparatus of claim 16, wherein the membrane feeding system comprises a membrane displacement member configured to displace the membrane portion present in the first intermediate spacing in a direction parallel to the adjustment direction of the first press device.

19. The apparatus of claim 2, wherein the template and the disc are positioned in a sandwich arrangement in the first intermediate spacing, and the membrane is positioned over the sandwich arrangement, comprising a membrane press member controlled to be placed in contact with a opposite surface of the membrane facing away from the sandwich arrangement, and a press displacing unit controlled to pass the press member over said opposite surface towards a periphery of the membrane.

20. The apparatus of claim 19, wherein the press member comprises a press roller controlled to roll over said opposite surface.

21. The apparatus of claim 1, comprising a disc insertion device, operable to pick up a disc from a stack of discs, and to position the disc in the first intermediate spacing.

22. The apparatus of claim 1, wherein the disc is a polymer foil.

23. The apparatus of claim 22, wherein the polymer foil is made from polycarbonate, COC or PMMA.

24. The apparatus of claim 2, wherein the membrane is made of a polymer material.

25. The apparatus of claim 2, wherein the membrane is made of polycarbonate, polypropylene, polyethylene, PDMS or PEEK.

26. The apparatus of claim 1, comprising a substrate insertion device, to pick up a substrate from a stack of substrates, and to position the substrate in the second intermediate spacing.

27. The apparatus of claim 1, comprising a source of de-ionizing gas, and a nozzle connected to the source and directed to pass de-ionizing gas towards the disc.

28. The apparatus of claim 3, wherein the disc is a polymer foil configured to act as the membrane by being placed in engagement with a gasket arranged about a portion of said one of the second pair of cooperating main parts to form the cavity.

29. The apparatus of claim 1, wherein the feeder device comprises a foil ribbon of which successive portions are used as the disc, and a feed motor configured to feed the ribbon to a position in the first intermediate spacing for the first imprint step, onward to the second intermediate spacing for the second imprint step and subsequently out of the second spacing.

30. The apparatus of claim 29, comprising a roller on which the foil ribbon is wound, and from which the ribbon is rolled off and pulled through the first and second intermediate spacing.

31. Apparatus for transferring a pattern of a structured surface of a template to a target surface of a substrate, comprising a molding unit, including a first pair of cooperating main parts arranged opposite to one another with an intermediate first spacing, a first spacing adjustment device, and a polymer applier device devised to provide molten polymer material over a pattern of a structured surface of a template in the intermediate first spacing to form a stamp with a receiving surface carrying a replica of the template pattern, an imprint unit including a second pair of cooperating main parts arranged opposite to one another with an intermediate second spacing, and a second spacing adjustment device including a press, and a feeder device arranged to move the stamp formed in the first molding unit from the first spacing to the second spacing, the second spacing adjustment device being arranged to adjust the second spacing between the stamp formed in the first molding unit and a target surface of a substrate, such that a replica of the template pattern is imprinted into the target surface of the substrate, wherein the second pair of cooperating main parts further includes a radiation emitting device arranged to emit radiation towards the second intermediate spacing, one of the second pair of cooperating main parts further includes a heating device arranged to maintain the target surface of the substrate at a predefined temperature and wherein a first support frame carries the first pair of cooperating main parts and a second support frame carries the second pair of cooperating main parts, and where a fixation member holds the first and the second support frames in a fixed relation to each other.

* * * * *